United States Patent
Indeck et al.

(10) Patent No.: US 10,909,623 B2
(45) Date of Patent: *Feb. 2, 2021

(54) METHOD AND APPARATUS FOR PROCESSING FINANCIAL INFORMATION AT HARDWARE SPEEDS USING FPGA DEVICES

(75) Inventors: Ronald S. Indeck, St. Louis, MO (US); Ron Kaplan Cytron, St. Louis, MO (US); Mark Allen Franklin, St. Louis, MO (US); Roger D. Chamberlain, St. Louis, MO (US)

(73) Assignee: IP Reservoir, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,340

(22) Filed: Nov. 21, 2011

(65) Prior Publication Data

US 2012/0130922 A1 May 24, 2012

Related U.S. Application Data

(63) Continuation of application No. 11/561,615, filed on Nov. 20, 2006, now Pat. No. 8,069,102, which is a
(Continued)

(51) Int. Cl.
 *G06Q 40/06* (2012.01)
 *G06Q 40/00* (2012.01)
 *G06F 16/2455* (2019.01)

(52) U.S. Cl.
 CPC ......... *G06Q 40/06* (2013.01); *G06F 16/2455* (2019.01); *G06Q 40/00* (2013.01);
(Continued)

(58) Field of Classification Search
 USPC .................. 705/35, 36 R, 36 T, 37
 See application file for complete search history.

(56) References Cited

U.S. PATENT DOCUMENTS

| | | |
|---|---|---|
| 2,046,381 A | 7/1936 | Hicks et al. |
| 3,082,402 A | 3/1963 | Scantlin |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

OrCAD unveils strategy for leadership of mainstream programmable logic design market; strategy includes partnerships and a next generation product, OrCAD express for windows: A shrink-wrapped 32-bit windows application that includes VHDL simulation and synthesis. (Jun. 3, 1996). Retrieved Sep. 16, 2020 (Year: 1996).*

(Continued)

*Primary Examiner* — Kito R Robinson
(74) *Attorney, Agent, or Firm* — Thompson Coburn LLP

(57) ABSTRACT

A method and apparatus use hardware logic deployed on a reconfigurable logic device to process a stream of financial information at hardware speeds. The hardware logic can be configured to perform data reduction operations on the financial information stream. Examples of such data reductions operations include data processing operations to compute a latest stock price, a minimum stock price, and a maximum stock price.

68 Claims, 24 Drawing Sheets

Related U.S. Application Data continuation of application No. 10/153,151, filed on May 21, 2002, now Pat. No. 7,139,743.

(52) U.S. Cl.
CPC .................. Y10S 707/99931 (2013.01); Y10S 707/99933 (2013.01); Y10S 707/99936 (2013.01)

(56) References Cited

U.S. PATENT DOCUMENTS

| | | |
|---|---|---|
| 3,296,597 A | 1/1967 | Scantlin et al. |
| 3,573,747 A | 4/1971 | Adams et al. |
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A * | 3/1978 | Vitols et al. ................. 704/237 |
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,811,210 A | 3/1989 | McAulay |
| 4,823,306 A | 4/1989 | Barbic et al. |
| 4,868,866 A | 9/1989 | Williams, Jr. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,644 A | 8/1992 | Kawaguchi et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,208,491 A * | 5/1993 | Ebeling ............ H03K 19/17704 326/39 |
| 5,226,165 A | 7/1993 | Martin |
| 5,233,539 A * | 8/1993 | Agrawal ............ H03K 19/1737 326/38 |
| 5,243,655 A | 9/1993 | Wang |
| 5,249,292 A | 9/1993 | Chiappa |
| 5,255,136 A * | 10/1993 | Machado et al. .......... 360/77.02 |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,361,373 A * | 11/1994 | Gilson ................ G06F 15/7867 712/1 |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,411 A | 4/1995 | Banton et al. |
| 5,404,488 A | 4/1995 | Kerrigan et al. |
| 5,418,951 A | 5/1995 | Damashek |
| 5,421,028 A | 5/1995 | Swanson |
| 5,432,822 A | 7/1995 | Kaewell, Jr. |
| 5,461,712 A | 10/1995 | Chelstowski et al. |
| 5,463,701 A | 10/1995 | Kantner, Jr. et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,544,352 A | 8/1996 | Egger |
| 5,546,578 A | 8/1996 | Takada et al. |
| 5,651,125 A | 7/1997 | Witt et al. |
| 5,680,634 A | 10/1997 | Estes |
| 5,684,980 A | 11/1997 | Casselman |
| 5,687,297 A | 11/1997 | Coonan et al. |
| 5,701,464 A | 12/1997 | Aucsmith |
| 5,704,060 A | 12/1997 | Del Monte |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,950,196 A * | 9/1999 | Pyreddy et al. ............. 715/227 |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,890 A | 11/2000 | Kawana et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,175,874 B1 | 1/2001 | Imai et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,243,753 B1 | 6/2001 | Machin et al. |
| 6,247,060 B1 | 6/2001 | Boucher et al. |
| 6,263,321 B1 | 7/2001 | Daughtery, III |
| 6,272,616 B1 | 8/2001 | Fernando et al. |
| 6,278,982 B1 | 8/2001 | Korhammer et al. |
| 6,279,113 B1 | 8/2001 | Vaidya |
| 6,289,440 B1 | 9/2001 | Casselman |

(56) References Cited

U.S. PATENT DOCUMENTS

| | | | |
|---|---|---|---|
| 6,295,530 B1 | 9/2001 | Ritchie et al. | |
| 6,304,858 B1 | 10/2001 | Mosler et al. | |
| 6,309,424 B1 | 10/2001 | Fallon | |
| 6,317,728 B1 | 11/2001 | Kane | |
| 6,317,795 B1 | 11/2001 | Malkin et al. | |
| 6,336,150 B1 | 1/2002 | Ellis et al. | |
| 6,339,819 B1 | 1/2002 | Huppenthal et al. | |
| 6,370,645 B1 | 4/2002 | Lee et al. | |
| 6,377,942 B1 | 4/2002 | Hinsley et al. | |
| 6,381,242 B1 | 4/2002 | Maher, III et al. | |
| 6,389,532 B1 | 5/2002 | Gupta et al. | |
| 6,397,259 B1 | 5/2002 | Lincke et al. | |
| 6,397,335 B1 | 5/2002 | Franczek et al. | |
| 6,412,000 B1 | 6/2002 | Riddle et al. | |
| 6,415,269 B1 | 7/2002 | Dinwoodie | |
| 6,418,419 B1 | 7/2002 | Nieboer et al. | |
| 6,430,272 B1 | 8/2002 | Maruyama et al. | |
| 6,456,632 B1 | 9/2002 | Baum et al. | |
| 6,456,982 B1 | 9/2002 | Pilipovic | |
| 6,463,474 B1 | 10/2002 | Fuh et al. | |
| 6,493,682 B1 | 12/2002 | Horrigan et al. | |
| 6,499,107 B1 | 12/2002 | Gleichauf et al. | |
| 6,546,375 B1 | 4/2003 | Pang et al. | |
| 6,564,263 B1 | 5/2003 | Bergman et al. | |
| 6,578,147 B1 | 6/2003 | Shanklin et al. | |
| 6,591,302 B2 | 7/2003 | Boucher et al. | |
| 6,594,643 B1 | 7/2003 | Freeny, Jr. | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,691,301 B2 | 2/2004 | Bowen | |
| 6,704,816 B1 | 3/2004 | Burke | |
| 6,711,558 B1 | 3/2004 | Indeck et al. | |
| 6,765,918 B1 | 7/2004 | Dixon et al. | |
| 6,766,304 B2 | 7/2004 | Kemp, II et al. | |
| 6,772,132 B1 | 8/2004 | Kemp, II et al. | |
| 6,772,136 B2 | 8/2004 | Kant et al. | |
| 6,772,345 B1 | 8/2004 | Shetty | |
| 6,778,968 B1 | 8/2004 | Gulati | |
| 6,785,677 B1 | 8/2004 | Fritchman | |
| 6,801,938 B1 | 10/2004 | Bookman et al. | |
| 6,804,667 B1 | 10/2004 | Martin | |
| 6,807,156 B1 | 10/2004 | Veres et al. | |
| 6,839,686 B1 | 1/2005 | Galant | |
| 6,850,906 B1 | 2/2005 | Chadha et al. | |
| 6,870,837 B2 | 3/2005 | Ho et al. | |
| 6,877,044 B2 | 4/2005 | Lo et al. | |
| 6,886,103 B1 | 4/2005 | Brustoloni et al. | |
| 6,901,461 B2 | 5/2005 | Bennett | |
| 6,931,408 B2 | 8/2005 | Adams et al. | |
| 6,944,168 B2 | 9/2005 | Paatela et al. | |
| 6,978,223 B2 | 12/2005 | Milliken | |
| 6,980,976 B2 | 12/2005 | Alpha et al. | |
| 6,981,054 B1 | 12/2005 | Krishna | |
| 7,003,488 B2 | 2/2006 | Dunne et al. | |
| 7,024,384 B2 | 4/2006 | Daughtery, III | |
| 7,046,848 B1 | 5/2006 | Olcott | |
| 7,065,475 B1 | 6/2006 | Brundobler | |
| 7,089,206 B2 | 8/2006 | Martin | |
| 7,089,326 B2 | 8/2006 | Boucher et al. | |
| 7,093,023 B2 | 8/2006 | Lockwood et al. | |
| 7,099,838 B1 | 8/2006 | Gastineau et al. | |
| 7,103,569 B1 | 9/2006 | Groveman et al. | |
| 7,124,106 B1 | 10/2006 | Stallaert et al. | |
| 7,127,424 B2 | 10/2006 | Kemp, II et al. | |
| 7,127,510 B2 | 10/2006 | Yoda et al. | |
| 7,130,913 B2 | 10/2006 | Fallon | |
| 7,139,743 B2 | 11/2006 | Indeck et al. | |
| 7,149,715 B2 | 12/2006 | Browne et al. | |
| 7,161,506 B2 | 1/2007 | Fallon | |
| 7,167,980 B2 | 1/2007 | Chiu | |
| 7,177,833 B1 | 2/2007 | Marynowski et al. | |
| 7,181,437 B2 | 2/2007 | Indeck et al. | |
| 7,181,608 B2 | 2/2007 | Fallon et al. | |
| 7,225,188 B1 | 5/2007 | Gai et al. | |
| 7,228,289 B2 | 6/2007 | Brumfield et al. | |
| 7,251,629 B1 | 7/2007 | Marynowski et al. | |
| 7,277,887 B1 | 10/2007 | Burrows et al. | |
| 7,321,937 B2 | 1/2008 | Fallon | |
| 7,356,498 B2 | 4/2008 | Kaminsky et al. | |
| 7,362,859 B1 | 4/2008 | Robertson et al. | |
| 7,363,277 B1 | 4/2008 | Dutta et al. | |
| 7,378,992 B2 | 5/2008 | Fallon | |
| 7,386,046 B2 | 6/2008 | Fallon et al. | |
| 7,406,444 B2 | 7/2008 | Eng et al. | |
| 7,417,568 B2 | 8/2008 | Fallon et al. | |
| 7,558,753 B2 | 7/2009 | Neubert et al. | |
| 7,565,525 B2 * | 7/2009 | Vorbach et al. | 713/100 |
| 7,714,747 B2 | 5/2010 | Fallon | |
| 7,840,482 B2 | 11/2010 | Singla et al. | |
| 7,917,299 B2 | 3/2011 | Buhler et al. | |
| 7,921,046 B2 | 4/2011 | Parsons et al. | |
| 7,945,528 B2 | 5/2011 | Cytron et al. | |
| 7,949,650 B2 | 5/2011 | Indeck et al. | |
| 7,953,743 B2 | 5/2011 | Indeck et al. | |
| 7,954,114 B2 | 5/2011 | Chamberlain et al. | |
| 8,027,893 B1 | 9/2011 | Burrows et al. | |
| 8,069,102 B2 | 11/2011 | Indeck et al. | |
| 8,095,508 B2 | 1/2012 | Chamberlain et al. | |
| 8,131,697 B2 | 3/2012 | Indeck et al. | |
| 8,407,122 B2 | 3/2013 | Parsons et al. | |
| 8,655,764 B2 | 2/2014 | Parsons et al. | |
| 8,751,452 B2 | 6/2014 | Chamberlain et al. | |
| 8,768,888 B2 | 7/2014 | Chamberlain et al. | |
| 8,843,408 B2 | 9/2014 | Singla et al. | |
| 9,020,928 B2 | 4/2015 | Indeck et al. | |
| 9,047,243 B2 | 6/2015 | Taylor et al. | |
| 9,396,222 B2 | 7/2016 | Indeck et al. | |
| 9,582,831 B2 | 2/2017 | Parsons et al. | |
| 9,672,565 B2 | 6/2017 | Parsons et al. | |
| 10,037,568 B2 | 7/2018 | Taylor et al. | |
| 10,062,115 B2 | 8/2018 | Taylor et al. | |
| 10,229,453 B2 | 3/2019 | Taylor et al. | |
| 10,572,824 B2 | 2/2020 | Chamberlain et al. | |
| 2001/0003193 A1 | 6/2001 | Woodring et al. | |
| 2001/0005314 A1 | 6/2001 | Farooq et al. | |
| 2001/0013048 A1 | 8/2001 | Imbert de Tremiolles et al. | |
| 2001/0014093 A1 | 8/2001 | Yoda et al. | |
| 2001/0015753 A1 | 8/2001 | Myers | |
| 2001/0015919 A1 | 8/2001 | Kean | |
| 2001/0033656 A1 | 10/2001 | Gligor et al. | |
| 2001/0041012 A1 | 11/2001 | Hsieh et al. | |
| 2001/0042040 A1 | 11/2001 | Keith | |
| 2001/0047473 A1 | 11/2001 | Fallon | |
| 2001/0052038 A1 | 12/2001 | Fallon et al. | |
| 2001/0056547 A1 | 12/2001 | Dixon | |
| 2002/0010825 A1 | 1/2002 | Wilson | |
| 2002/0019812 A1 | 2/2002 | Board et al. | |
| 2002/0023010 A1 | 2/2002 | Rittmaster et al. | |
| 2002/0031125 A1 | 3/2002 | Sato | |
| 2002/0038276 A1 | 3/2002 | Buhannic et al. | |
| 2002/0038279 A1 | 3/2002 | Samuelson et al. | |
| 2002/0069370 A1 | 6/2002 | MacK | |
| 2002/0069375 A1 | 6/2002 | Bowen | |
| 2002/0072893 A1 | 6/2002 | Wilson | |
| 2002/0080871 A1 | 6/2002 | Fallon et al. | |
| 2002/0082967 A1 | 6/2002 | Kaminsky et al. | |
| 2002/0095512 A1 | 7/2002 | Rana et al. | |
| 2002/0095519 A1 | 7/2002 | Philbrick et al. | |
| 2002/0100029 A1 | 7/2002 | Bowen | |
| 2002/0101425 A1 | 8/2002 | Hamid | |
| 2002/0105911 A1 | 8/2002 | Pruthi et al. | |
| 2002/0119803 A1 | 8/2002 | Bitterlich et al. | |
| 2002/0129140 A1 | 9/2002 | Peled et al. | |
| 2002/0138376 A1 | 9/2002 | Hinkle | |
| 2002/0143521 A1 | 10/2002 | Call | |
| 2002/0147670 A1 | 10/2002 | Lange | |
| 2002/0156998 A1 | 10/2002 | Casselman | |
| 2002/0159530 A1 | 10/2002 | Olson et al. | |
| 2002/0162025 A1 | 10/2002 | Sutton et al. | |
| 2002/0166063 A1 | 11/2002 | Lachman et al. | |
| 2002/0180742 A1 | 12/2002 | Hamid | |
| 2002/0181709 A1 | 12/2002 | Sorimachi et al. | |

(56) References Cited

U.S. PATENT DOCUMENTS

| | | |
|---|---|---|
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0039355 A1 | 2/2003 | McCanny et al. |
| 2003/0041129 A1 | 2/2003 | Applcby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1* | 4/2003 | Satchwell ............ 705/36 |
| 2003/0065943 A1 | 4/2003 | Geis et al. |
| 2003/0069723 A1 | 4/2003 | Klegde |
| 2003/0074177 A1 | 4/2003 | Bowen |
| 2003/0074489 A1 | 4/2003 | Steger et al. |
| 2003/0074582 A1 | 4/2003 | Patel et al. |
| 2003/0078865 A1 | 4/2003 | Lee |
| 2003/0079060 A1 | 4/2003 | Dunlop |
| 2003/0086300 A1 | 5/2003 | Noyes et al. |
| 2003/0093347 A1 | 5/2003 | Gray |
| 2003/0097481 A1 | 5/2003 | Richter |
| 2003/0099254 A1 | 5/2003 | Richter |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0117971 A1 | 6/2003 | Aubury |
| 2003/0120460 A1 | 6/2003 | Aubury |
| 2003/0121010 A1 | 6/2003 | Aubury |
| 2003/0126065 A1 | 7/2003 | Eng et al. |
| 2003/0130899 A1 | 7/2003 | Ferguson et al. |
| 2003/0140337 A1 | 7/2003 | Aubury |
| 2003/0163715 A1 | 8/2003 | Wong |
| 2003/0167348 A1 | 9/2003 | Greenblat |
| 2003/0172017 A1 | 9/2003 | Feingold et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0217306 A1 | 11/2003 | Harthcock et al. |
| 2003/0221013 A1 | 11/2003 | Lockwood et al. |
| 2004/0006433 A1 | 1/2004 | Robson et al. |
| 2004/0015502 A1 | 1/2004 | Alexander et al. |
| 2004/0015633 A1 | 1/2004 | Smith |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0059666 A1 | 3/2004 | Waelbroeck et al. |
| 2004/0073703 A1 | 4/2004 | Boucher et al. |
| 2004/0123258 A1 | 6/2004 | Butts |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0205149 A1 | 10/2004 | Dillon et al. |
| 2005/0033672 A1 | 2/2005 | Lasry et al. |
| 2005/0044344 A1 | 2/2005 | Stevens |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0267836 A1 | 12/2005 | Crosthwaite et al. |
| 2005/0283423 A1 | 12/2005 | Moser et al. |
| 2006/0020536 A1 | 1/2006 | Renton et al. |
| 2006/0031154 A1 | 2/2006 | Noviello et al. |
| 2006/0031156 A1 | 2/2006 | Noviello et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0143099 A1 | 6/2006 | Partlow et al. |
| 2006/0259417 A1 | 11/2006 | Marynowski et al. |
| 2006/0292292 A1 | 12/2006 | Brightman et al. |
| 2006/0294059 A1 | 12/2006 | Chamberlain et al. |
| 2007/0078837 A1 | 4/2007 | Indeck et al. |
| 2007/0118500 A1 | 5/2007 | Indeck et al. |
| 2007/0156574 A1 | 7/2007 | Marynowski et al. |
| 2007/0174841 A1 | 7/2007 | Chamberlain et al. |
| 2007/0277036 A1 | 11/2007 | Chamberlain et al. |
| 2007/0294157 A1 | 12/2007 | Singla et al. |
| 2008/0109413 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2009/0182683 A1 | 7/2009 | Taylor et al. |
| 2009/0287628 A1 | 11/2009 | Indeck et al. |
| 2011/0040701 A1 | 2/2011 | Singla et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0215801 A1 | 8/2012 | Indeck et al. |
| 2014/0040109 A1 | 2/2014 | Parsons et al. |
| 2014/0067830 A1 | 3/2014 | Buhler et al. |
| 2014/0089163 A1 | 3/2014 | Parsons et al. |
| 2014/0164215 A1 | 6/2014 | Parsons et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0181133 A1 | 6/2014 | Parsons et al. |
| 2016/0070583 A1 | 3/2016 | Chamberlain et al. |
| 2017/0102950 A1 | 4/2017 | Chamberlain et al. |
| 2017/0124255 A1 | 5/2017 | Buhler et al. |
| 2018/0330444 A1 | 11/2018 | Taylor et al. |
| 2019/0073719 A1 | 3/2019 | Parsons et al. |

FOREIGN PATENT DOCUMENTS

| | | |
|---|---|---|
| EP | 0851358 A | 7/1998 |
| EP | 0887723 | 12/1998 |

(56) References Cited

FOREIGN PATENT DOCUMENTS

| | | |
|---|---|---|
| EP | 0911738 A | 4/1999 |
| JP | 02136900 A | 5/1990 |
| JP | 03014075 A | 1/1991 |
| JP | 09145544 A | 6/1997 |
| JP | 9-269930 | 10/1997 |
| JP | 10313341 | 11/1998 |
| JP | 11306268 A | 11/1999 |
| JP | 11316765 A | 11/1999 |
| JP | 2000357176 | 12/2000 |
| JP | 2001014239 | 1/2001 |
| JP | 2001217834 | 8/2001 |
| WO | 199010910 | 9/1990 |
| WO | 199409443 A1 | 4/1994 |
| WO | 199737735 | 10/1997 |
| WO | 199905814 | 2/1999 |
| WO | 1999055052 | 10/1999 |
| WO | 2000041136 A1 | 7/2000 |
| WO | 2001022425 A | 3/2001 |
| WO | 2001039577 | 6/2001 |
| WO | 2001061913 | 8/2001 |
| WO | 2001080082 A2 | 10/2001 |
| WO | 2001080558 | 10/2001 |
| WO | 2002061525 | 8/2002 |
| WO | 2002082271 | 10/2002 |
| WO | 2003100650 | 4/2003 |
| WO | 2003036845 | 5/2003 |
| WO | 2003100662 | 12/2003 |
| WO | 2004017604 | 2/2004 |
| WO | 2005017708 A | 2/2005 |
| WO | 2005026925 | 3/2005 |
| WO | 2005048134 A | 5/2005 |
| WO | 2006023948 | 3/2006 |
| WO | 2010/077829 | 7/2010 |

OTHER PUBLICATIONS

Smith, E. (Oct. 10, 1994). QuickLogic QuickWorks guarantees fastest FPGA design cycle. Business Wire Retrieved from https://dialog.proquest.corn/professional/docview/447031280?accountid=131444 retrieved Sep. 16, 2020 (Year: 1994).*
"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 Gigabit Workshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"RFC793: Transmission Control Protocol, Darpa Internet Program, Protocol Specification", Sep. 1981.
"The Field-Programmable Port Extender (FPX)", downloaded from http://www.arl.wustl.edu/arl/ in Mar. 2002.
Altschul et al., "Basic Local Alignment Search Tool", J. Mol. Biol., Oct. 5, 1990, 215, pp. 403-410.
Amanuma et al., "A FPGA Architecture for High Speed Computation", Proceedings of 60th Convention Architecture, Software Science, Engineering, Mar. 14, 2000, pp. 1-163-1-164, Information Processing Society, Japan.
Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.
Anonymous, "Method for Allocating Computer Disk Space to a File of Known Size", IBM Technical Disclosure Bulletin, vol. 27, No. 10B, Mar. 1, 1985, New York.

Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Barone-Adesi et al., "Efficient Analytic Approximation of American Option Values", Journal of Finance, vol. 42, No. 2 (Jun. 1987), pp. 301-320.
Berk "JLex: A lexical analyzer generator for Java™", downloaded from http://www.cs.princeton.edu/~appel/modern/java/Jlex/ in Jan. 2002, pp. 1-18.
Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Cavnar et al., "N-Gram-Based Text Categorization", Proceedings of SDAIR-94, 3rd Annual Symposium on Document Analysis and Information Retrieval, Las Vegas, pp. 161-175, 1994.
Chaney et al., "Design of a Gigabit ATM Switch", Washington University, St. Louis.
Chodowiec et al., "Fast Implementations of Secret-Key Block Ciphers Using Mixed Inter- and Outer-Round Pipelining", Proceedings of International Symposium on FPGAs, pp. 94-102 (Feb. 2001).
Choi et al., "Design of a Flexible Open Platform for High Performance Active Networks", Allerton Conference, 1999, Champaign, IL.
Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Cong et al., "An Optional Technology Mapping Algorithm for Delay Optimization in Lookup-Table Based FPGA Designs", IEEE, 1992, pp. 48-53.
Crosman, "Who Will Cure Your Data Latency?", Storage & Servers, Jun. 20, 2007, URL: http://www.networkcomputing.com/article/printFullArticleSrc.jhtml?article ID=199905630.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.
Decision of the Examining Division for EP Patent Application No. 03729000.4 dated Jul. 12, 2010.
Denoyer et al., "HMM-based Passage Models for Document Classification and Ranking", Proceedings of ECIR-01, 23rd European Colloquim Information Retrieval Research, Darmstatd, DE, pp. 126-135, 2001.

(56) References Cited

OTHER PUBLICATIONS

Dharmapurikar et al., "Deep Packet Inspection Using Parallel Bloom Filters," Symposium on High Performance Interconnects (Hotl), Stanford, California, 2003, pp. 44-51.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Ebeling et al., "RaPiD—Reconfigurable Pipelined Datapath", University of Washington, Dept. of Computer Science and Engineering, Sep. 23, 1996, Seattle, WA.
Edgar, "MUSCLE: Multiple Sequence Alignment with High Accuracy and High Throughput", Nucleic Acids Research, 2004, vol. 32, No. 5, pp. 1792-1797.
English Translation of Office Action for JP Application 2004-508044 dated Feb. 9, 2010.
Feldmann, "BLT: Bi-Layer Tracing of HTTP and TCP/IP", AT&T Labs—Research, Florham Park, NJ, USA.
Fernandez, "Template Matching of Binary Targets in Grey-Scale Images: A Nonparametric Approach", Pattern Recognition, 1997, pp. 1175-1182, vol. 30, No. 7.
Fips 197, "Advanced Encryption Standard", National Institute of Standards and Technology (2001).
Fips Pub. 46-3. Data Encryption Standard (DES). Revised version of 46-2. Reaffirmed Oct. 25, 1999.
Forgy, "RETE: A fast algorithm for the many pattern/many object pattern matching problem", Artificial Intelligence, 19, pp. 17-37, 1982.
Franklin et al., "Assisting Network Intrusion Detection with Reconfigurable Hardware", Symposium on Field-Programmable Custom Computing Machines (FCCM 2002), Apr. 2002, Napa, California.
Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.
Gavrila et al., "Multi-feature Hierarchical Template Matching Using Distance Transforms", IEEE, Aug. 16-20, 1998, vol. 1, pp. 439-444.
Google Search Results Page for "field programmable gate array financial calculation stock market" over dates of Jan. 1, 1990-May 21, 2002, 1 page.
Guerdoux-Jamet et al., "Systolic Filter for Fast DNA Similarity Search", IEEE, 1995, pp. 145-156.
Gunther et al., "Assessing Document Relevance with Run-Time Reconfigurable Machines", FPGAs for Custom Computing Machines, 1996, Proceedings, IEEE Symposium on, pp. 10-17, Napa Valley, CA, Apr. 17, 1996.
Gupta et al., "High-Speed Implementations of Rule-Based Systems," ACM Transactions on Computer Systems, May 1989, pp. 119-146, vol. 7, Issue 2.
Gupta et al., "Packet Classification on Multiple Fields", Computer Systems Laboratory, Stanford University, Stanford, CA.
Gupta et al., "PMM: A Parallel Architecture for Production Systems," Proceedings of the IEEE, Apr. 1992, pp. 693-696, vol. 2.
Gurtov, "Effect of Delays on TCP Performance", Cellular Systems Development, Sonera Corporation, online at http://cs.helsinki.fi/u/gurtov/papers/pwc01.pdf.
Harris, "Pete's Blog: Can FPGAs Overcome the FUD?", Low-Latency.com, May 14, 2007, URL: http://www.a-teamgroup.com/article/pete-blog-can-fpgas-overcome-the-fud/.
Hauck et al., "Software Technologies for Reconfigurable Systems", Northwestern University, Dept. of ECE, Technical Report, 1996.
Hayes, "Computer Architecture and Organization", Second Edition, 1988, pp. 448-459, McGraw-Hill, Inc.
Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.
Hirsch, "Tech Predictions for 2008", Reconfigurable Computing, Jan. 16, 2008, URL: http://fpgacomputing.blogspot.com/2008_01_01_archive.html.
Hoinville, et al. "Spatial Noise Phenomena of Longitudinal Magnetic Recording Media", IEEE Transactions on Magnetics, vol. 28, No. 6, Nov. 1992.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Hutchings et al., "Assisting Network Intrusion Detection with Reconfigurable Hardware", FCCM 2002: 10th Annual IEEE Symposium on Field-Programmable Custom Computing Machines, 2002.
International Preliminary Report on Patentability (Chapter I) for PCT/US2008/066929 dated Jan. 7, 2010.
International Search Report for PCT/US2001/011255 dated Jul. 10, 2003.
International Search Report for PCT/US2002/033286 dated Jan. 22, 2003.
International Search Report for PCT/US2003/015638 dated May 6, 2004.
International Search Report for PCT/US2004/016021 dated Aug. 18, 2005.
International Search Report for PCT/US2004/016398 dated Apr. 12, 2005.
International Search Report for PCT/US2005/030046; dated Sep. 25, 2006.
International Search Report for PCT/US2007/060835 dated Jul. 9, 2007.
International Search Report for PCT/US2008/065955 dated Aug. 22, 2008.
International Search Report for PCT/US2008/066929 dated Aug. 29, 2008.
Invitation to Pay Additional Fees and Annex to Form PCT/ISA/206 Communication Relating to the Results of the Partial International Search for International Application PCT/US2003/015638 dated Feb. 3, 2004.
Jacobson et al., "RFC 1072: TCP Extensions for Long-Delay Paths", Oct. 1988.
Jacobson et al., "tcpdump—dump traffic on a network", Jun. 30, 1997, online at www.cse.cuhk.edu.hk/~cslui/CEG4430/tcpdump.ps.gz.
Jeanmougin et al., "Multiple Sequence Alignment with Clustal X", TIBS, 1998, vol. 23, pp. 403-405.
Johnson et al., "Pattern Matching in Reconfigurable Logic for Packet Classification", College of Computing, Georgia Institute of Technology, Atlanta, GA.
Jones et al., "A Probabilistic Model of Information Retrieval: Development and Status", Information Processing and Management, Aug. 1998, 76 pages.
Jung et al., "Efficient VLSI for Lempel-Ziv Compression in Wireless Data Communication Networks", IEEE Transactions on VLSI Systems, Sep. 1998, pp. 475-483, vol. 6, No. 3, Institute of Electrical and Electronics Engineers, Washington, DC, USA.
Keutzer et al., "A Survey of Programmable Platforms—Network Proc", University of California—Berkeley, pp. 1-29.
Kulig et al., "System and Method for Controlling Transmission of Data Packets Over an Information Network", pending U.S. Patent Application.
Lin et al., "Real-Time Image Template Matching Based on Systolic Array Processor", International Journal of Electronics; Dec. 1, 1992; pp. 1165-1176; vol. 73, No. 6; London, Great Britain.
Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.
Lockwood et al., "Hello, World: A Simple Application for the Field Programmable Port Extender (FPX)", Washington University, Department of Computer Science, Technical Report WUCS-00-12, Jul. 11, 2000.
Lockwood et al., "Parallel FPGA Programming over Backplane Chassis", Washington University, Department of Computer Science, Technical Report WUCS-00-11, Jun. 12, 2000.

(56) References Cited

OTHER PUBLICATIONS

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.
Lockwood, "An Open Platform for Development of Network Processing Modules in Reprogrammable Hardware", IEC DesignCon 2001, Santa Clara, CA, Jan. 2001, Paper WB-19.
Lockwood, "Building Networks with Reprogrammable Hardware", Field Programmable Port Extender: Jan. 2002 Gigabit Workshop Tutorial, Washington University, St. Louis, MO, Jan. 3-4, 2002.
Lockwood, "Evolvable Internet Hardware Platforms", NASA/DoD Workshop on Evolvable Hardware (EHW'01), Long Beach, CA, Jul. 12-14, 2001, pp. 271-279.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St. Louis, MO, Jan. 3-4, 2002.
Lockwood, "Simulation and Synthesis", Field Programmable Port Extender: Jan. 2002 Gigabit Workshop Tutorial, Washington University, St. Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.
Madhusudan, "Design of a System for Real-Time Worm Detection", Master's Thesis, Washington Univ., Dept. of Computer Science and Engineering, St. Louis, MO, Aug. 2004.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mao et al., "Cluster-based Online Monitoring System of Web Traffic", Dept. of Computer Science and Technology, Tsinghua Univ., Bejing, 100084 P.R. China.
Minutes of the Oral Proceedings for EP Patent Application No. 03729000.4 dated Jul. 12, 2010.
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.
Web-Pop (Professional Options Package) (www.pmpublishing.com).
Wooster et al., "HTTPDUMP Network HTTP Packet Snooper", Apr. 25, 1996.
Written Submissions to EPO for EP Application 03729000.4 dated May 10, 2010.
Yamaguchi et al., "An Approach for Homology Search with Reconfigurable Hardware", Google, 2001, pp. 374-375.
Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.
Yan et al., "Enhancing Collaborative Spam Detection with Bloom Filters", 2006, IEEE, pp. 414-425.
Yoshitani et al., "Performance Evaluation of Parallel Volume Rendering Machine Re Volver/C40", Study Report of Information Processing Society, Mar. 5, 1999, pp. 79-84, vol. 99, No. 21.
Ziv et al., "A Universal Algorithm for Sequential Data Compression", IEEE Trans. Inform. Theory, IT-23(3): 337-343 (1997).
Ziv et al., "Compression of Individual Sequence via Variable-Rate Coding", IEEE Transactions on Information Theory, Sep. 1978, pp. 530-536, vol. IT-24, No. 5, Institute of Electrical and Electronics Engineers, Washington, DC, USA.
U.S. Appl. No. 61/421,545, filed Dec. 9, 2010 (Taylor et al.).
Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.
Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.
Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Navarro, "A Guided Tour to Approximate String Matching", ACM Computing Surveys, vol. 33, No. 1, Mar. 2001, pp. 31-88.
Necker et al., "TCP-Stream Reassembly and State Tracking in Hardware", School of Electrical and Computer Engineering, Georgia Institute of Technology, Atlanta, GA.
Notice of Allowance for U.S. Appl. No. 10/550,323 dated Aug. 5, 2011.
Nunez et al, "The X-MatchLITE FPGA-Based Data Compressor", Euromicro Conference 1999, Proceedings, Italy, Sep. 8-10, 1999, pp. 126-132, Los Alamitos, CA.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Office Action for AU Application 2009200148 dated Nov. 9, 2010.
Office Action for U.S. Appl. 11/765,306 dated Mar. 29, 2010.
Partial International Search Report for PCT/US03/15638 dated Feb. 3, 2004.
Patterson, "High Performance DES Encryption in Virtex™ FPGAs using JBits™", IEEE Symposium on Field-Programmable Custom Computing Machines, 2000, pp. 113-121.
Pirsch et al., "VLSI Architectures for Video Compression—A Survey", Proceedings of the IEEE, Feb. 1995, pp. 220-243, vol. 83, No. 2, Institute of Electrical and Electronics Engineers, Washington, DC, USA.
Prakash et al., "OC-3072 Packet Classification Using BDDs and Pipelined SRAMs", Department of Electrical and Computer Engineering, The University of Texas at Austin.
Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.
Provisional Opinion of Examining Division for EP Patent Application No. 03729000.4 dated Jun. 2, 2010.
Ramakrishna et al., "A Performance Study of Hashing Functions for Hardware Applications", Int. Conf. on Computing and Information, May 1994, pp. 1621-1636, vol. 1, No. 1.
Ramakrishna et al., "Efficient Hardware Hashing Functions for High Performance Computers", IEEE Transactions on Computers, Dec. 1997, vol. 46, No. 12.
Ranganathan et al., "High-Speed VLSI Designs for Lempe-Ziv Based Data Compression", IEEE Transactions on Circuits and Systems-II: Analog and Digital Signal Processing, Feb. 1993, pp. 96-106, vol. 40, No. 2, Institute of Electrical and Electronics Engineers, Washington, DC, USA.
Ratha et al., "Convolution on Splash 2", Proceedings of IEEE Symposium on FPGAS for Custom Computing Machines, Apr. 19, 1995, pp. 204-213, Los Alamitos, California.
Ratha et al., "FPGA-based coprocessor for text string extraction", IEEE, Sep. 11-13, 2000, pp. 217-221.

(56) References Cited

OTHER PUBLICATIONS

Roberts, "Internet Still Growing Dramatically Says Internet Founder", Press Release, Caspian Networks, Inc.—Virtual Pressroom.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Sachin Tandon, "A Programmable Architecture for Real-Time Derivative Trading", Master's Thesis, University of Edinburgh, 2003.

Schmerken, "With Hyperfeed Litigation Pending, Exegy Launches Low-Latency Ticker Plant", in Wall Street & Technology Blog, Mar. 20, 2007, pp. 1-2.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.

Seki et al., "High Speed Computation of Shogi With FPGA", Proceedings of 58th Convention Architecture, Software Science, Engineering, Mar. 9, 1999, pp. 1-133-1-134.

Shah, "Understanding Network Processors", Version 1.0, University of California—Berkeley, Sep. 4, 2001.

Shalunov et al., "Bulk TCP Use and Performance on Internet 2", ACM SIGCOMM Internet Measurement Workshop, 2001.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Statement of Grounds of Appeal for EP Patent Application No. 03729000.4 dated Nov. 22, 2010.

Steinbach et al., "A Comparison of Document Clustering Techniques", KDD Workshop on Text Mining, 2000.

Summons to Attend Oral Proceedings for EP Application 03729000.4 dated Mar. 17, 2010.

Tau et al., "Transit Note #114: A First Generation DPGA Implementation", Jan. 1995, 9 pages.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thompson et al., "The CLUSTAL_X Windows Interface: Flexible Strategies for Multiple Sequence Alignment Aided by Quality Analysis Tools", Nucleic Acids Research, 1997, vol. 25, No. 24, pp. 4876-4882.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Response to Office Action for U.S. Appl. No. 13/077,294 dated May 10, 2012.

Response to Office Action for U.S. Appl. No. 13/301,387 dated Jun. 6, 2012.

Celko, "Joe Celko's Data & Databases: Concepts in Practice", 1999, pp. 72-74, Morgan Kaufmann Publishers.

Dehon, "DPGA-coupled microprocessors: commodity ICs for the early 21st Century", FPGAS for Custom Computing Machines, 1994, Proceedings. IEEE Workshop on Napa Valley, CA, pp. 31-39, Los Alamitos, CA.

Ibrahim et al., "Lecture Notes in Computer Science: Database and Expert Systems Applications", 2000, p. 769, vol. 1873, Springer.

Motwani et al., "Randomized Algorithms", 1995, pp. 215-216, Cambridge University Press.

Office Action for U.S. Appl. No. 13/301,387 dated Jun. 6, 2012.
Office Action for U.S. Appl. No. 13/345,011 dated Aug. 28, 2012.
Worboys, "GIS: A Computing Perspective", 1995, pp. 245-247, 287, Taylor & Francis Ltd.
Office Action for U.S. Appl. No. 13/301,387 dated Jun. 3, 2015.
Office Action for U.S. Appl. No. 13/301,387 dated Jan. 5, 2017.
Board of Appeal Decision for EP03729000.4 dated May 2, 2016.
Office Action for U.S. Appl. No. 12/013,302 dated Sep. 9, 2016.
Gaughan, "Data Streaming: Very Low Overhead Communication for Fine-Grained Multicomputing", 1995, <http://dx.doi.org/ 10.1109/SPDP.1995.530727>, 3 pages.
Office Action for U.S. Appl. No. 13/301,387 dated Aug. 27, 2018.
Srini, "DFS-SuperMPx: Low-Cost Parallel Processing System for Machine Vision and Image Processing", 1995, Retrieved from https://dialog.proquest.com/professional/docview/828015663?accountid=142257, 3 pages.
Office Action for U.S. Appl. No. 13/301,387 dated Jun. 13, 2019.
Notice of Allowance for U.S. Appl. No. 16/503,244 dated Feb. 20, 2020, 13 pages.
Office Action for U.S. Appl. No. 13/301,387 dated Dec. 23, 2019.
Office Action for U.S. Appl. No. 13/301,387 dated Oct. 6, 2020.

\* cited by examiner

|   | p | q | r | a | x | a | b | c | s | t | v | q | ... |
|---|---|---|---|---|---|---|---|---|---|---|---|---|---|
| a | -1 | -1 | -1 | 2 | 1 | 2 | 1 | 0 | -1 | -1 | -1 | -1 | |
| x | -1 | -2 | -2 | 1 | 4 | 3 | 2 | 1 | 0 | -1 | -2 | -2 | |
| b | -1 | -2 | -3 | 0 | 3 | 2 | 5 | 4 | 3 | 2 | 1 | 0 | |
| a | -1 | -2 | -3 | -1 | 2 | 1 | 4 | 3 | 2 | 1 | 0 | -1 | |
| c | -1 | -2 | -3 | -2 | 1 | 0 | 3 | 6 | 5 | 4 | 3 | 2 | |
| s | -1 | -2 | -3 | -3 | 0 | -1 | 2 | 5 | <u>8</u> | 7 | 6 | 5 | |

Figure 19

METHOD AND APPARATUS FOR PROCESSING FINANCIAL INFORMATION AT HARDWARE SPEEDS USING FPGA DEVICES

CROSS REFERENCE TO RELATED APPLICATION

This application is a continuation of Ser. No. 11/561,615 filed Nov. 20, 2006, now U.S. Pat. No. 8,069,102, which is a continuation of Ser. No. 10/153,151 filed May 21, 2002, now U.S. Pat. No. 7,139,743, the disclosure of the '743 patent being incorporated herein by reference.

This application is related to Ser. No. 13/301,387, filed concurrently herewith, entitled "Method and Apparatus for Processing Financial Information at Hardware Speeds Using FPGA Devices", which is a continuation of Ser. No. 10/153,151 filed May 21, 2002, now U.S. Pat. No. 7,139,743.

BACKGROUND OF THE INVENTION

Indications are that the average database size and associated software support systems are growing at rates that are greater than the increase in processor performance (i.e., more than doubling roughly every 18 months). This is due to a number of factors including without limitation the desire to store more detailed information, to store information over longer periods of time, to merge databases from disparate organizations, and to deal with the large new databases which have arisen from emerging and important applications. For example, two emerging applications having large and rapidly growing databases are those connected with the genetics revolution and those associated with cataloging and accessing information on the Internet. In the case of the Internet, current industry estimates are that in excess of 1.5 million pages are added to the Internet each day. At the physical level this has been made possible by the remarkable growth in disk storage performance where magnetic storage density has been doubling every year or so for the past five years.

Search and retrieval functions are more easily performed on information when it is indexed. For example, with respect to financial information, it can be indexed by company name, stock symbol and price. Oftentimes, however, the information being searched is of a type that is either hard to categorize or index or which falls into multiple categories. As a result, the accuracy of a search for information is only as good as the accuracy and comprehensiveness of the index created therefor. In the case of the Internet, however, the information is not indexed. The bottleneck for indexing is the time taken to develop the reverse index needed to access web pages in reasonable time. For example, while there are search engines available, designing a search which will yield a manageable result is becoming increasingly difficult due to the large number of "hits" generated by less than a very detailed set of search instructions. For this reason, several "intelligent" search engines have been offered on the web, such as Google, which are intended to whittle down the search result using logic to eliminate presumed undesired "hits".

With the next-generation Internet, ever-faster networks, and expansion of the Internet content, this bottleneck is becoming a critical concern. Further, it is becomingly exceedingly difficult to index information on a timely basis. In the case of the Internet, current industry estimates are that in excess of 1.5 million pages are added to the Internet each day. As a result, maintaining and updating a reverse index has become an enormous and continuous task and the bottleneck it causes is becoming a major impediment to the speed and accuracy of existing search and retrieval systems. Given the ever increasing amounts of information available, however, the ability to accurately and quickly search and retrieve desired information has become critical.

DESCRIPTION OF ART

Associative memory devices for dealing with large databases are known in the prior art. Generally, these associative memory devices comprise peripheral memories for computers, computer networks, and the like, which operate asynchronously to the computer, network, etc. and provide increased efficiency for specialized searches. Additionally, it is also known in the prior art that these memory devices can include certain limited decision-making logic as an aid to a main CPU in accessing the peripheral memory. An example of such an associative memory device particularly adapted for use with a rotating memory such as a high speed disk or drum can be found in U.S. Pat. No. 3,906,455, the disclosure of which is incorporated herein by reference. This particular device provides a scheme for use with a rotating memory and teaches that two passes over a memory sector is necessary to presort and then sort the memory prior to performing any logical operations thereon. Thus, this device is taught as not being suitable for use with any linear or serial memory such as magnetic tape or the like.

Other examples of prior art devices may also be found in U.S. Pat. Nos. 3,729,712; 4,464,718; 5,050,075; 5,140,692; and 5,721,898; the disclosures of which are incorporated herein by reference.

As an example, in U.S. Pat. No. 4,464,718, Dixon performs fixed comparisons on a fixed number of bytes. They don't have the ability to scan and correlate arbitrarily over the data. They search serially along the tracks in a given disk cylinder but there is no provision for parallel searching across disks. Dixon's comparisons are limited by a fixed rigid number of standard logical operation types. Additionally, the circuitry presented supports only these single logical operations. There is no support for approximate or fuzzy matching.

While these prior art associative memory devices represent an attempt to speed the input and output of information to and from a peripheral memory, which in many cases is a mass storage memory device, all rely on the classic accessing of data stored in digital form by reading and interpreting the digital either address or content of the memory location. In other words, most such devices access data by its address but there are some devices that take advantage of the power of content addressing as is well known in the art. Nevertheless, in all of the prior art known to the inventors, the digital value of the address or data contained in the addressed location must be read and interpreted in its digital form in order to identify the data and then select it for processing. Not only does it take processing time to read and interpret the digital data represented by the address or content, this necessarily requires that the accessing circuit process the memory according to the structure of the data stored. In other words, if the data is stored in octets, then the accessing circuitry must access the data in octets and process it in an incremental manner. This "start and stop" processing serves to increase the input/output time required to access data. As is also well known in the art, this input/output time typically represents the bottleneck and effective limitation of processing power in any computer or computer network.

Furthermore, given the vast amount of information available to be searched, data reduction operations (i.e., the ability to summarize data in some aggregate form) has become critical. Oftentimes, the ability to quickly perform data reduction functions can provide a company with a significant competitive advantage.

Likewise, with the improvements in digital imaging technology, the ability to perform two dimensional matching such as on images has become necessary. For example, the ability to conduct matches on a particular image of an individual, such as his or her face or retina, or on a fingerprint, is becoming critical to law enforcement as it steps up its efforts on security in light of the Sep. 11, 2001 terrorist attacks. Image matching is also of importance to the military in the area of automatic target recognition.

Finally, existing searching devices cannot currently be quickly and easily reconfigured in response to changing application demands.

Accordingly, there is a need for an improved information search and retrieval system and method which overcomes these and other problems in the prior art.

In order to solve these and other problems in the prior art, the inventors herein have succeeded in designing and developing a method and apparatus for an associative memory using Field Programmable Gate Arrays (FPGA) in several embodiments described in the parent U.S. Pat. No. 7,139,743, which provide an elegantly simple solution to these prior art limitations as well as dramatically decreased access times for data stored in mass storage memories. As described below, the invention has several embodiments each of which has its own advantages.

U.S. Pat. No. 6,711,558, which is the parent of the '743 patent referenced above, discloses and claims the use of programmable logic and circuitry generally without being specific as to any choice between the various kinds of devices available for this part of the invention. In the '743 patent, the inventors disclose more specifically the use of FPGA's as part of the circuitry for various reasons as their best mode. There are several reasons for that. The first of these is speed. And, there are two different aspects of operation in which speed plays a part. The first of these is the speed of reconfiguration. It is known in the art that FPGA's may be quickly programmed in the field to optimize the search methodology using a template, the template having been prepared in advance and merely communicated to the FPGA's over a connecting bus. Should it then be desired to search using a different methodology, the FPGA's may then be quickly and conveniently re-programmed with another prepared template in a minimal number of clock cycles and the second search started immediately. Thus, with FPGA's as the re-configurable logic, shifting from one search to another is quite easy and quick, relative to other types of re-programmable logic devices.

A second aspect of speed is the amount of time required, once programmed, a search requires. As FPGA's are hardware devices, searching is done at hardware processing speeds which is orders of magnitude faster than at software processing speeds as would be experienced with a microprocessor, for example. Thus, FPGA's are desirable over other software implementations where speed is a consideration as it most often is.

In considering the use of templates, it is contemplated that at least several "generic" templates would be prepared in advance and would be available for use in performing text searching in either an absolute search, an approximate search, or a higher or advanced search mode incorporating a Boolean algebra logic capability, or a graphics search mode. These could then be stored in a CPU memory and be available either on command or loaded in automatically in response to a software queue indicating one of these searches.

Still another factor to consider is cost, and the recent price reductions in FPGA's have made them more feasible for implementation as a preferred embodiment for this application, especially as part of a hard disk drive accelerator as would be targeted for a pc market. It is fully expected that further cost reductions will add to the desirability of these for this implementation, as well as others as discussed in greater detail below.

Generally, various embodiments of the '743 patent describe a technique for data retrieval through approximate matching of a data key with a continuous reading of data as stored on a mass storage medium, using FPGA's to contain the template for the search and do the comparison, all in hardware and at essentially line speed. By utilizing FPGA's, the many advantages and features commonly known are made available. These include the ability to arrange the FPGA's in a "pipeline" orientation, in a "parallel" orientation, or even in an array incorporating a complex web overlay of interconnecting data paths allowing for complex searching algorithms. In its broadest, and perhaps most powerful, embodiment, the data key may be an analog signal and it is matched with an analog signal generated by a typical read/write device as it slews across the mass storage medium. In other words, the steps taught to be required in the prior art of not only reading the analog representation of digital data stored on the mass storage medium but also the conversion of that signal to its digital format prior to being compared are eliminated. Furthermore, there is no requirement that the data be "framed" or compared utilizing the structure or format in which the data has been organized and stored. For an analog signal, all that need be specified is the elapsed time of that signal which is used for comparison with a corresponding and continuously changing selected time portion of the "read" signal. Using any one of many standard correlation techniques as known in the prior art, the data "key" may then be approximately matched to the sliding "window" of data signal to determine a match. Significantly, the same amount of data may be scanned much more quickly and data matching the search request may be determined much more quickly as well. For example, the inventors have found that CPU based approximate searches of 200 megabytes of DNA sequences can take up to 10 seconds on a typical present day "high end" system, assuming the offline processing to index the database has already been completed. In that same 10 seconds, the inventors have found that a 10-gigabyte disk could be magnetically searched for approximate matches using the present invention. This represents a 50:1 improvement in performance. Furthermore, in a typical hard disk drive there are four surfaces and corresponding read/write heads, which may be all searched in parallel should each head be equipped with the present invention. As these searches can proceed in parallel, the total increase in speed or improvement represents a 200:1 advantage. Furthermore, additional hard disk drives may be accessed in parallel and scaled to further increase the advantage provided by the present invention.

By choosing an appropriate correlation or matching technique, and by setting an appropriate threshold, the search may be conducted to exactly match the desired signal, or more importantly and perhaps more powerfully, the threshold may be lowered to provide for approximate matching searches. This is generally considered a more powerful search mode in that databases may be scanned to find "hits"

which may be valid even though the data may be only approximately that which is being sought. This allows searching to find data that has been corrupted, incorrectly entered data, data which only generally corresponds to a category, as well as other kinds of data searches that are highly desired in many applications. For example, a library of DNA sequences may be desired to be searched and hits found which represent an approximate match to a desired sequence of residues. This ensures that sequences which are close to the desired sequence are found and not discarded but for the difference in a forgivable number of residue mismatches. Given the ever-increasing volume and type of information desired to be searched, more complex searching techniques are needed. This is especially true in the area of molecular biology, "[O]ne of the most powerful methods for inferring the biological function of a gene (or the protein that it encodes) is by sequence similarity searching on protein and DNA sequence databases." Garfield, "*The Importance of (Sub)sequence Comparison in Molecular Biology*," pgs. 212-217, the disclosure of which is incorporated herein by reference. Current solutions for sequence matching are only available in software or non-reconfigurable hardware.

Still another application involves Internet searches provided by Internet search engines. In such a search, approximate matching allows for misspelled words, differently spelled words, and other variations to be accommodated without defeating a search or requiring a combinatorial number of specialized searches. This technique permits a search engine to provide a greater number of hits for any given search and ensure that a greater number of relevant web pages are found and cataloged in the search. Although, as mentioned above, this approximate matching casts a wider net which produces a greater number of "hits" which itself creates its own problems.

Still another possible application for the technology described in the '743 patent is for accessing databases which may be enormous in size or which may be stored as analog representations. For example, our society has seen the implementation of sound recording devices and their use in many forums including judicial proceedings. In recent history, tape recordings made in the President's oval office have risen in importance with respect to impeachment hearings. As can be appreciated, tape recordings made over the years of a presidency can accumulate into a huge database which might require a number of persons to actually listen to them in order to find instances where particular words are spoken that might be of interest. Utilizing the technology described in the '743 patent, an analog representation of that spoken word can be used as a key and sought to be matched while the database is scanned in a continuous manner and at rapid speed. Thus, the technology described in the '743 patent provides a powerful search tool for massive analog databases as well as massive digital databases.

While text-based searches are accommodated by the '743 patent as described above, storage media containing images, sound, and other representations have traditionally been more difficult to search than text. The '743 patent further describes embodiments that allow searching a large data base for the presence of such content or fragments thereof. For example, the key in this case could be a row or quadrant of pixels that represent the image being sought. Approximate matching of the key's signal can then allow identification of matches or near matches to the key. In still another image application, differences in pixels or groups of pixels can be searched and noted as results which can be important for satellite imaging where comparisons between images of the same geographic location are of interest as indicative of movement of equipment or troops.

The technology described in the '743 patent may be embodied in any of several configurations, as is noted more particularly below. However, one important embodiment is perhaps in the form of a disk drive accelerator which would be readily installed in any PC as an interface between the hard disk drive and the system bus. This disk drive accelerator could be provided with a set of standardized templates and would provide a "plug and play" solution for dramatically increasing the speed at which data could be accessed from the drive by the CPU. This would be an after market or retrofit device to be sold to the large installed base of PC's. It could also be provided as part of a new disk drive, packaged within the envelope of the drive case or enclosure for an external drive or provided as an additional plug in pc card as an adapter for an internal drive. Additional templates for various kinds of searches on various kinds of databases could be made available either with the purchase of the accelerator, such as by being encoded on a CD, or even over the Internet for download, as desired.

BRIEF SUMMARY OF THE INVENTION

The present invention leverages the hardware acceleration and flexibility provided by reconfigurable logic devices to perform various operations such as data reduction operations (e.g., aggregate summarization operations) on streaming financial information. For example, in the financial industry, one might want to search financial information to identify a minimum, maximum, and latest price of a stock. The ability to perform data reduction searching such as this at high speeds cannot be under-estimated. One of the most valuable aspects of information is its timeliness. Companies that can quickly compute aggregate data reductions will clearly have a competitive advantage over those that cannot compute such aggregate data reductions as quickly.

Thus, in accordance with an exemplary aspect of the invention, the inventors disclose an apparatus for financial information data reduction searching, the apparatus comprising a reconfigurable logic device having a hardware template deployed thereon for configuring the reconfigurable logic device to perform a data reduction operation on streaming financial information, the streaming financial information comprising data representative of a plurality of stocks and data representative of a plurality of prices for the stocks, the hardware template defining matching hardware logic and downstream summarization hardware logic that are resident on the reconfigurable logic device, wherein the matching hardware logic is configured to perform a match operation on the streaming financial information to find matched data within the streaming financial information, wherein the matched data comprises data representative of a plurality of stock prices for a stock, and wherein the summarization hardware logic is configured to generate a price summary of the stock prices within the matched data.

In accordance with another exemplary aspect of the invention, the inventors disclose a method for financial information data reduction searching, the method comprising: performing, by a reconfigurable logic device, a data reduction operation on streaming financial information, the streaming financial information comprising data representative of a plurality of stocks and data representative of a plurality of prices for the stocks, the reconfigurable logic device having a hardware template deployed thereon for configuring the reconfigurable logic device to perform data reduction operation, the hardware template defining matching hardware logic and downstream summarization hardware logic that are resident on the reconfigurable logic device, wherein the data reduction performing step comprises (1) the matching hardware logic performing a match operation on the streaming financial information to find matched data within the streaming financial information, wherein the matched data comprises data representative of a plurality of stock prices for a stock, and (2) the summarization hardware logic generating a price summary of the stock prices within the matched data.

While the principal advantages and features of the present invention have been briefly explained above, a more thorough understanding of the invention may be attained by referring to the drawings and description of the preferred embodiment which follow.

BRIEF DESCRIPTION OF THE DRAWINGS

FIG. 19 is the table of FIG. 15 representing a particular sequence matching example;

DETAILED DESCRIPTION OF THE PREFERRED EMBODIMENT

Figure 1:
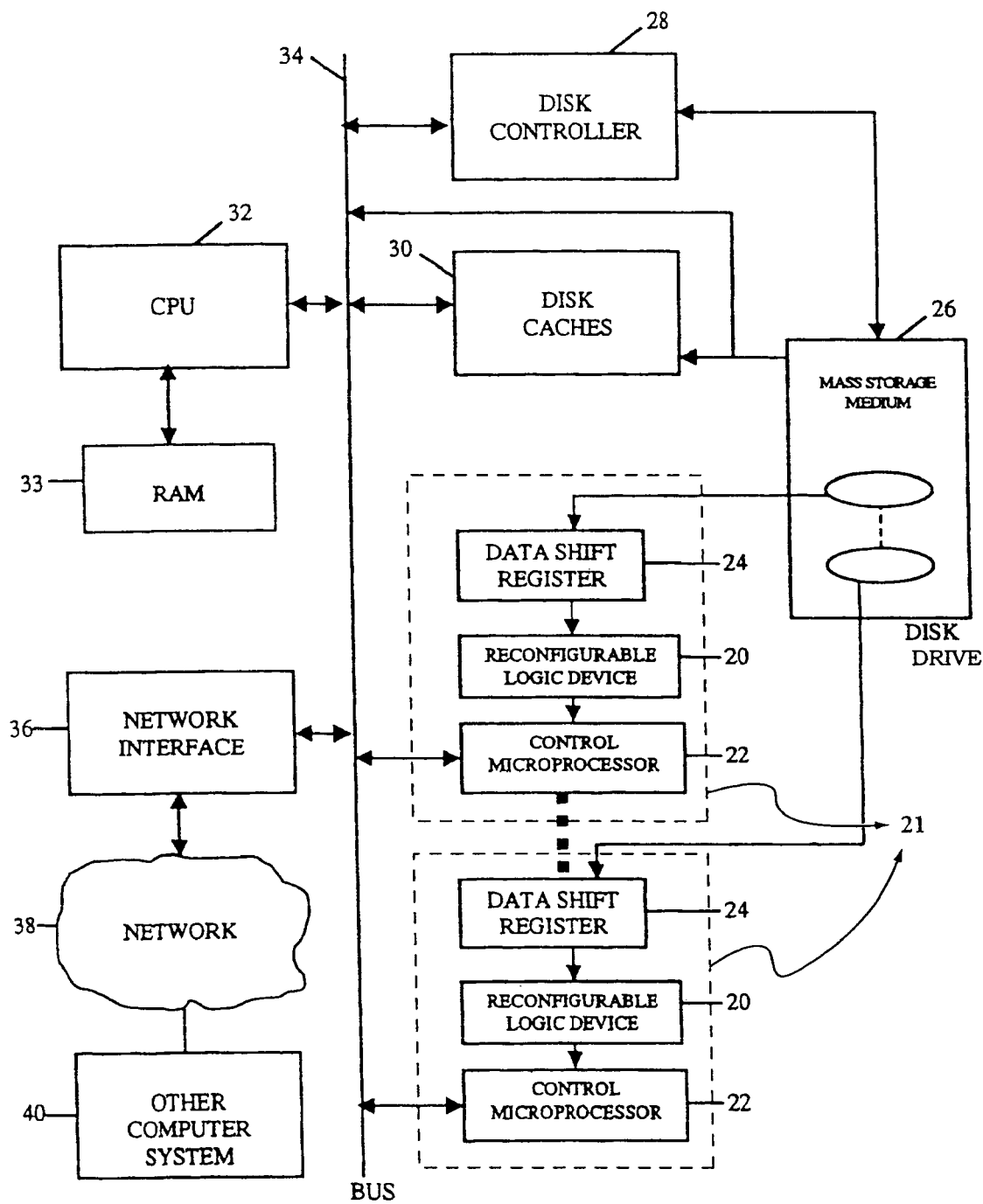
FIG. 1 is a block diagram illustrating an information search and retrieval system in accordance with one embodiment of the present invention.

As shown in FIG. 1, the present invention is readily implemented in a stand-alone computer or computer system. In broad terms, the present invention is comprised of at least one re-configurable logic device 21 coupled to at least one magnetic mass storage medium 26, with that re-configurable logic device being an FPGA. As depicted in FIG. 1, the re-configurable logic device 21 may itself include a plurality of functional logic elements including a data shift register and possibly a microprocessor, or they could be on separate chips, or the individual logic elements could be configured in a pipeline or parallel orientation as shown in some of the other figures herein. In any event, re-configurable logic refers to any logic technology whose form and function can be significantly altered (i.e., reconfigured) in the field post-manufacture. Examples of re-configurable logic devices include without limitation programmable logic devices (PLDs). A PLD is an umbrella term for a variety of chips that are programmable. There are generally three physical structures for a PLD. The first is the permanent fuse type which blows apart lines or fuses them together by electrically melting an aluminum trace or insulator. This was the first type of PLD, known as a "programmable array logic" or PAL. The second type of PLD uses EEPROM or flash memory, and causes a transistor to open or close depending on the contents of its associated memory cell. The third type of PLD is RAM-based (which makes it dynamic and volatile), and its contents are loaded each time it starts up. An FPGA is an integrated circuit (IC) that contains an array of logic units that can be interconnected in an arbitrary manner. These logic units are referred to as CFB's or configurable logic blocks by one vendor (Xilinx). Both the specific function of each logic unit and the interconnections between logic units can be programmed in the field after manufacture of the IC. FPGAs are one of the most common PLD chips. FPGAs are available in all three structures. In the preferred embodiment of the present invention, re-configurable logic device 21 is constructed using Xilinx FPGA technology, and its configuration is developed using the Mentor synthesis tools and the Xilinx place-and-route tools, all of which are presently commercially available as known to those of skill in the art.

The re-configurable logic device 21 interfaces with the system or input/output bus 34 and, in one configuration, also interfaces with any disk caches 30 which may be present. It receives and processes search requests or inquires from the CPU 32 or network interface 36. Additionally, the device may aid in passing the results of the inquiries to either or both the disk cache 30 and/or the CPU 32 (by way of the bus 34).

The mass storage medium 26 provides the medium for storing large amounts of information which will hereafter be referred to as target data. The term "mass storage medium" should be understood as meaning any magnetic device used to store large amounts of data, and which is typically designated for use in a computer or computer network. Examples include without limitation hard disk drives or sub-units such as a single disk surface, and these systems may be rotating, linear, serial, parallel, or various combinations of each. For example, a rack of hard disk drive units could be connected in parallel and their parallel output provided at the transducer level to one or more re-configurable logic devices 21. Similarly, a bank of magnetic tape drives could be used, and their serial outputs each provided in parallel to one or more re-configurable logic devices 21. The data stored on the medium may be in analog or in digital form. For example, the data could be voice recordings. The present invention is thus scalable, permitting an increase in the amount of data stored by increasing the number of parallel mass storage media, while preserving the performance by increasing the number of parallel re-configurable logic devices or replicating the re-configurable logic device.

In the prior art as shown in the upper portion of FIG. 1, typically a disk controller 28 and/or a disk cache 30 may be used in the traditional sense for access by a CPU 32 over its system or input/output bus 34. The re-configurable logic device 21 accesses target data in the mass storage medium 26 via one or more data shift registers 24 and presents it for use at the system bus 34 without moving large blocks of memory from the mass storage medium 26 over the system bus 34 and into the working memory 33 of CPU 32 for sorting and accessing. In other words, as is explained in greater detail below, the CPU 32 may send a search request or inquiry to the re-configurable logic device 21 which then asynchronously accesses and sorts target data in the mass storage medium 26 and presents it for use either in a disk cache 30 as is known in the prior art or directly onto the system bus 34 without further processing being required by CPU 32 or use of its working memory 33. The CPU 32 is thus free to perform other tasks while the searching and matching activity is being performed by the present invention. Alternately, the control microprocessor may provide the search inquiry and template or programming instructions for the FPGA 21, and then perform the search and present the data on system bus 34 for access and use by CPU 32.

Figure 2:
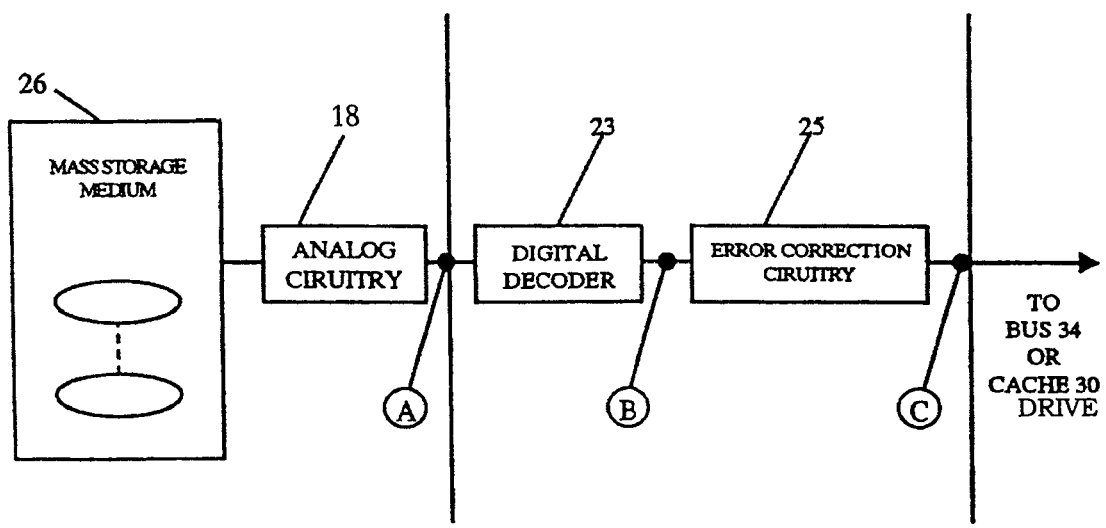
FIG. 2 is a schematic of a conventional rigid disk drive system illustrating different insertion points for connection of the present invention.

As has been explained above, the present invention may be used to perform a variety of different types of matching or data reduction operations on the target data. Each one of these operations will now be discussed in detail below. For all operations, however, it will be assumed that the target data is written onto the magnetic mass storage medium 26 with sufficient formatting information attached so that the logical structure of the target data can be extracted. Exact and approximate string matching will be described with reference to FIGS. 2-5. It can be appreciated, however, that the present invention is not limited to single string matches and is equally suitable for compound query matching (i.e., queries involving a plurality of text strings having a certain logical relationship therebetween or which use Boolean algebra logic). When performing an exact match with the re-configurable logic device 21 in the analog domain, shown as Point A in FIG. 2, where matching is done using analog comparators and correlation techniques, an exact match corresponds to setting a sufficiently high threshold value for matching the data key with analog target data on the mass storage medium 26. Approximate matching in the analog domain corresponds to setting appropriate (lesser) threshold values. The success of an approximate match may be determined by the correlation value set in the re-configurable logic device 21 or by using one of a number of matching-performance metrics stored therein such as the number of bits within a data key that are equal to the corresponding bits in the scanned target data.

More particularly, a conventional rigid disk drive may have a plurality of rotating disks with multiple transducers accessing each disk. Each of these transducers typically has its output feeding analog signal circuitry 18, such as amplifiers. This is represented at point A. As further shown in FIG. 2, typically the outputs of the analog circuitry are selectively provided to a single digital decoder 23 which then processes one such output. This is represented at point B. This digital output is typically then sent through error correction circuitry (ECC) 25 and at its output C is then passed on to the bus 34 or disk cache 30. For purposes of the present invention, it may be desirable to provide multiple parallel paths for target data by providing multiple digital decoders and ECC's. Exact matching in the digital domain could be performed at Point B or Point C, which corresponds to the pre- and post-error-corrected digital signal, respectively.

The results may be sent to a control microprocessor 22, which may or may not be configured as part of an FPGA, to execute logic associated with a compound or complex search inquiry. In the most general case, a compound search inquiry 40 will go through the transformation process illustrated in FIG. 3. In particular, the software system (not shown) that resides on the CPU 32 generates the search inquiry 40. This inquiry proceeds through a compiler 42, also located on the CPU 32, that is responsible for analyzing the search inquiry. There are three main results from this analysis: (1) determining the data key that will reside in the compare registers within the re-configurable logic device 21; (2) determining the combining logic that must be implemented in the control microprocessor 22; and (3) producing hardware description 44 in a standard hardware description language (HDL) format (or if possible retrieving one from a library) that will be used to generate synthesis commands 46 to the re-configurable logic device 21. Any commercially available HDL and associated compiler and synthesis tools may be used. The resulting logic functions may correspond to exact or inexact matches or wildcard operations and simple word level logic operations such as "and" and "or." This synthesis information is sent to the control microprocessor 22 which acts to set up the re-configurable logic device 21, or FPGA. In the case of complex logic operations, a high-level language 48 such as C or C+ is used in conjunction with a compiler 50 to generate the appropriate synthesis commands to the microprocessor 22.

Figure 3:
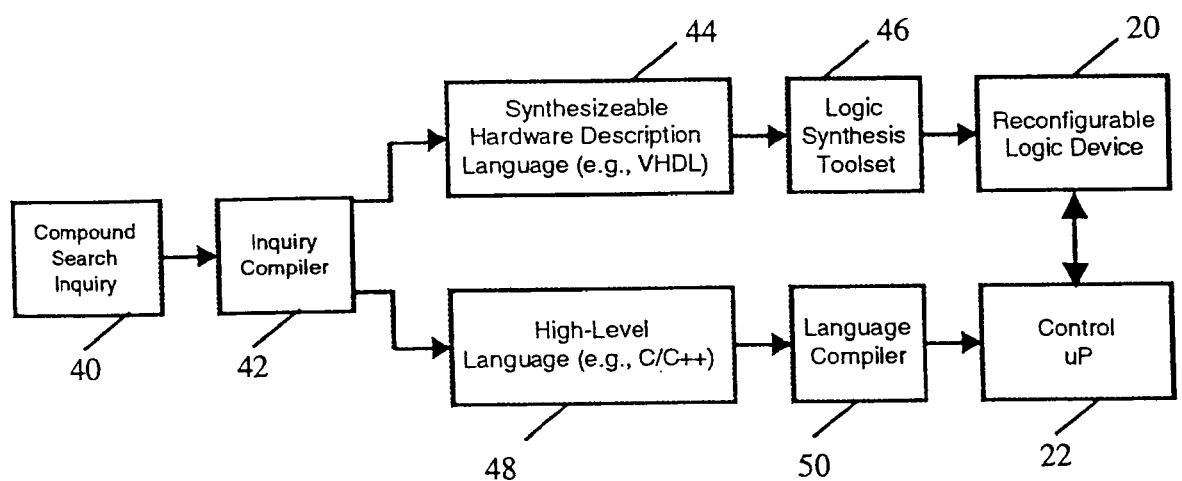
FIG. 3 is a block diagram of one embodiment of the transformation of a search inquiry processed by the system of FIG. 1.

While the path shown in FIG. 3 is able to handle a wide range of potential search inquiries, it has the drawback that the latency introduced into the search process might be too long. If the time required for a search inquiry to flow through the transformations represented in FIG. 3 is of the same order as the time required to perform a search, the compilation process might become the performance bottleneck rather than the search itself. This issue can be addressed for a wide range of likely search inquiries by maintaining a set of precompiled hardware templates that handle the most common cases. These templates may be provided and maintained either in CPU 32 memory, made available through an off-line storage medium such as a CD, or even kept in the mass storage medium 26 itself. Still further, such templates may be communicated to CPU 32 such as over a network or the Internet.

Figure 4:
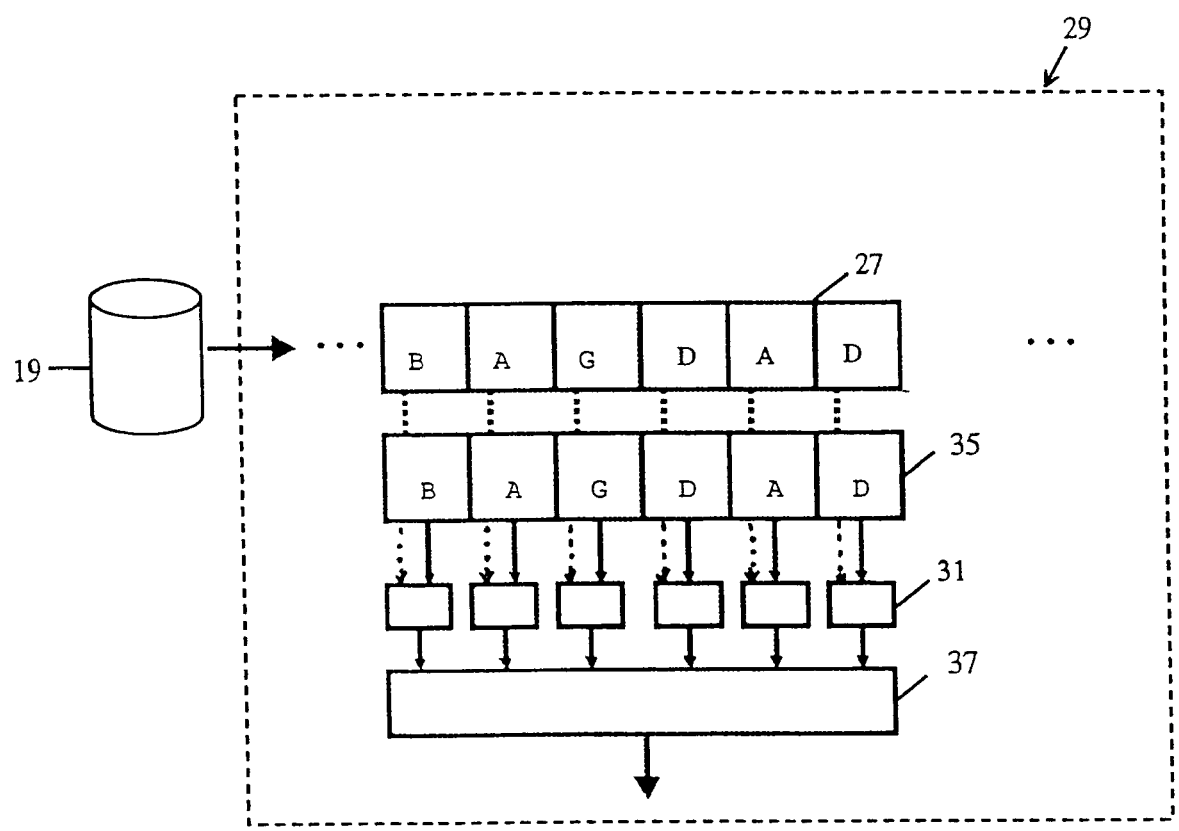
FIG. 4 is a block diagram of one embodiment of a hardware implementation of the present invention used to conduct an exact match search in a digital domain.

One embodiment of such a hardware template 29 is illustrated in FIG. 4. In particular, the data shift register 27 contains target data streaming off the head (not shown) of one or more disks 19. A compare register stores the data key for which the user wishes to match. In the example shown, the data key is "Bagdad." Fine-grained comparison logic device 31 performs element by element comparisons between the elements of the data shift register 27 and the compare register 35. The fine-grained comparison logic device 31 can be configured to be either case sensitive or case insensitive. Word-level comparison logic 37 is responsible for determining whether or not a match at the world-level occurs. In the case of a compound search inquiry, the word-level match signals are delivered to the control microprocessor 22 for evaluation thereof. A match to the compound search inquiry is then reported to the CPU 32 for further processing.

Figure 5:
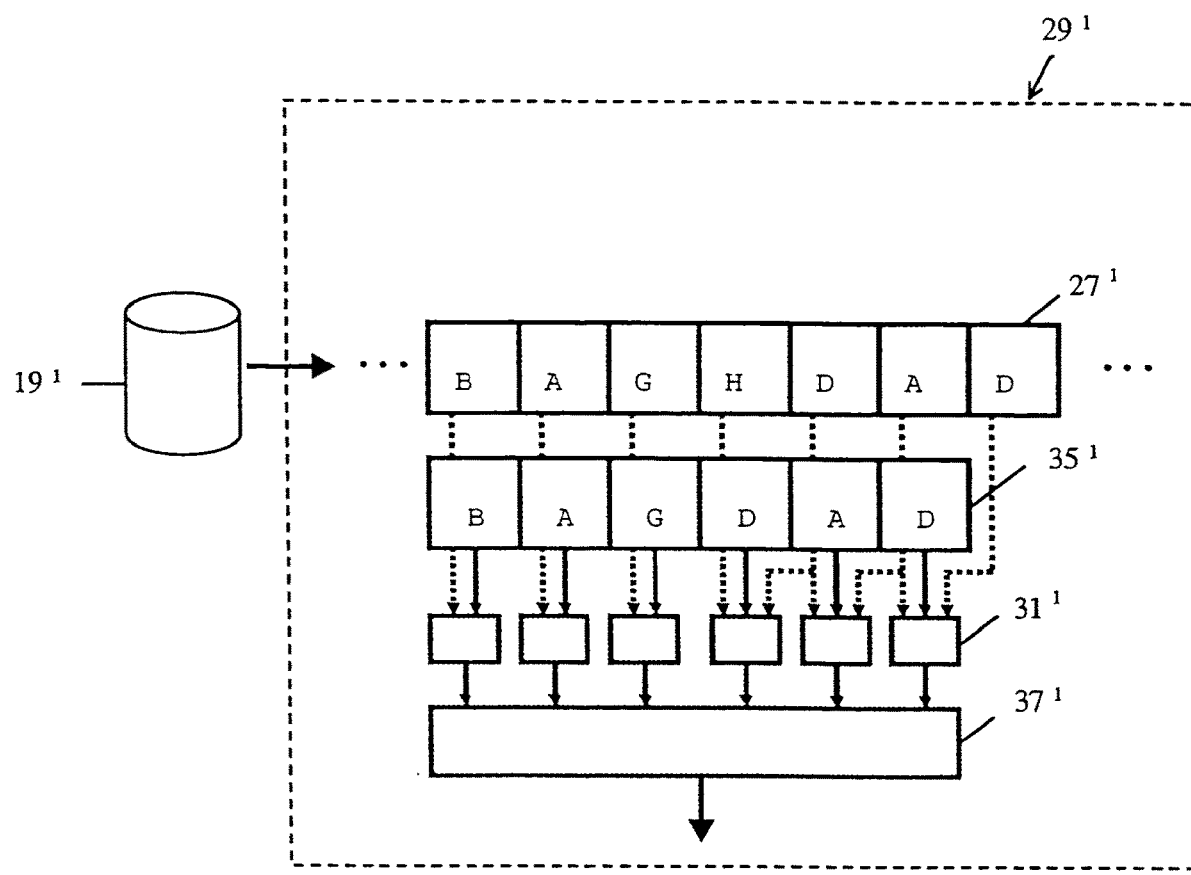
FIG. 5 is a block diagram of one embodiment of a hardware implementation of the present invention used to conduct an approximate match search in a digital domain.

One embodiment of a hardware template for conducting approximate matching is illustrated in FIG. 5. In particular, the data shift register 27' contains target data streaming off the head (not shown) of one or more disks 19'. A compare register 35' stores the data key for which the user wishes to match. In the example shown, the data key is again "Bagdad." Fine-grained comparison logic 31' performs element by element comparisons between the elements of the data shift register 27' and the compare register 21'. Again, the fine-grained comparison logic device 31' can be configured to be either case sensitive or case insensitive. The template 29' provides for alternate routing of elements in data shift register 27' to individual cells of the fine-grained comparison logic device 21'. Specifically, each cell of the fine-grained comparison logic device 31' can match more than one position in the data shift register 27' such that the compare register 21' can match both the commonly used spelling of "Baghdad" as well as the alternate "Bagdad" in shared hardware. Word-level comparison logic 37' is responsible for determining whether or not a match at the word level occurs. In the case of a compound search inquiry, the word-level match signals are delivered to the control microprocessor 22 for evaluation thereof. A match to the compound search inquiry is then reported to the CPU 32 for further processing.

The actual configuration of the hardware template will of course vary with the search inquiry type. By providing a small amount of flexibility in the hardware templates (e.g., the target data stored in the compare registers, the routing of signals from the data shift registers and compare register elements to the cells of the fine-grained comparison logic device, and the width of the word-level comparison logic), such a template can support a wide range of word matches. As a result, this diminishes the frequency with which the full search inquiry transformation represented in FIG. 3 must take place, which in turn, increases the speed of the search.

It should be noted that the data entries identified in an "approximate" match search will include the "exact" hits that would result from an "exact" search. For clarity, when the word "match" is used, it should be understood that it includes a search or a data result found through either of an approximate search or an exact search. When the phrase "approximate match" or even just "approximate" is used, it should be understood that it could be either of the two searches described above as approximate searches, or for that matter any other kind of "fuzzy" search that has a big enough net to gather target data that are loosely related to the search inquiry or in particular, data key. Of course, an exact match is just that, and does not include any result other than an exact match of the search inquiry with a high degree of correlation.

Also shown in FIG. 1 is a network interface 36 interconnecting the present invention to a network 38 which may be a LAN, WAN, Internet, etc. and to which other computer systems 40 may be connected. With this arrangement, other computer systems 40 may conveniently also access the data stored on the mass storage medium 26 through the present invention 21. More specific examples are given below. Still further as shown in FIG. 1, the elements 20-24 may themselves be packaged together and form a disk drive accelerator that may be separately provided as a retrofit device for adapting existing pc's having their own disk drives with the advantages of the present invention. Alternately, the disk drive accelerator may also be offered as an option on a hard drive and packaged in the same enclosure for an external drive or provided as a separate pc board with connector interface for an internal drive. Still further alternatively, the disk drive accelerator may be offered as an option by pc suppliers as part of a pc ordered by a consumer, business or other end user. Still another embodiment could be that of being offered as part of a larger magnetic mass storage medium, or as an upgrade or retrofit kit for those applications or existing installations where the increased data handling capability could be used to good advantage.

Figure 6:
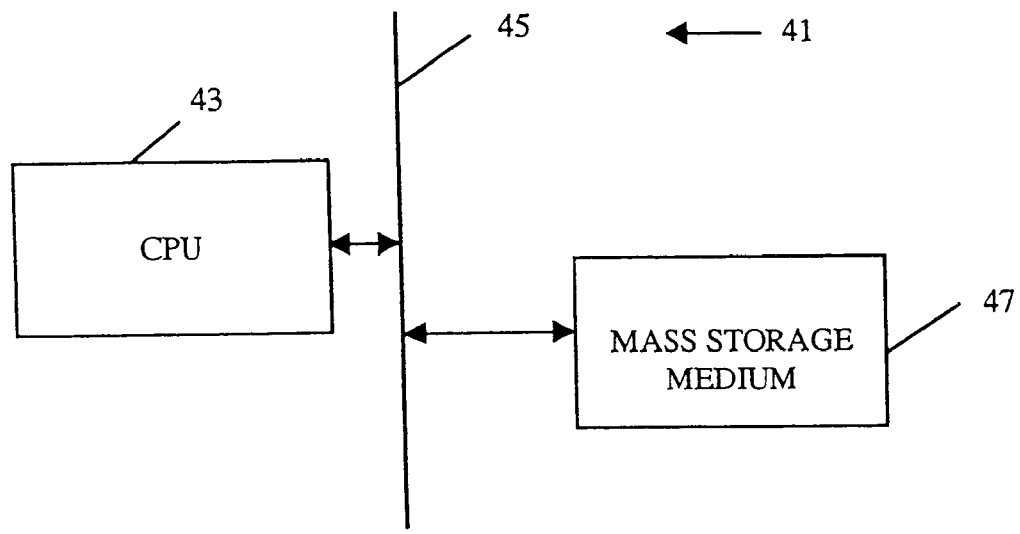
FIG. 6 is a block diagram depicting the implementation of the present invention in a stand-alone configuration.
Figure 7:
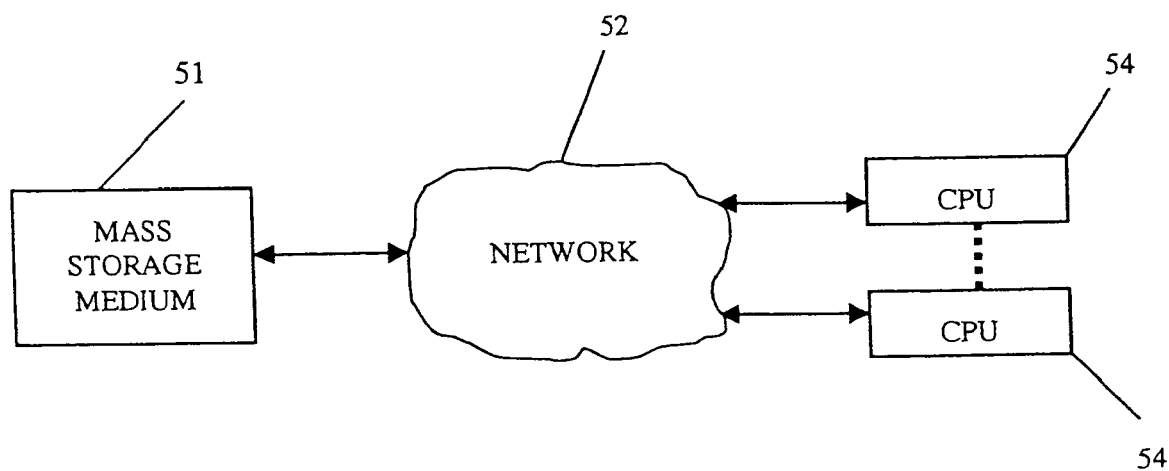
FIG. 7 is a block diagram depicting the present invention implemented as a shared remote mass storage device across a network.
Figure 8:
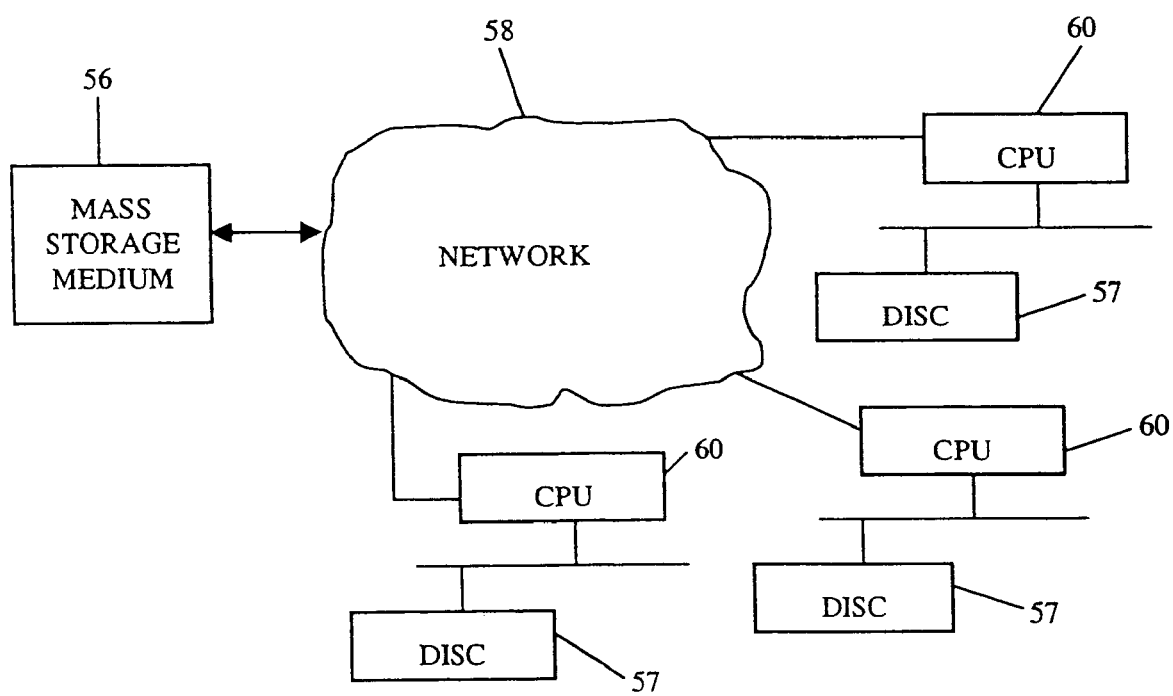
FIG. 8 is a block diagram depicting the present invention as a network attached storage device (NASD)

As shown in FIGS. 6-8, the present invention may be implemented in a variety of computer and network configurations. As shown in FIG. 6, the present invention may be provided as part of a stand-alone computer system 41 comprising a CPU 43 connected to a system bus 45 which then accesses a mass storage medium 47 having the invention as disclosed herein.

As shown in FIG. 7, the mass storage medium 51 coupled with the present invention may be itself connected directly to a network 52 over which a plurality of independent computers or CPU's 54 may then access the mass storage medium 51. The mass storage medium 51 may itself be comprised of a bank of hard disk drives comprising a RAID, disk farm, or some other massively parallel memory device configuration to provide access and approximate matching capabilities to enormous amounts of data at significantly reduced access times.

As shown in FIG. 8, a mass storage medium 56 coupled with the present invention may be connected to a network 58 as a network attached storage device (NASD) such that over the network 58 a plurality of stand-alone computers 60 may have access thereto. With such a configuration, it is contemplated that each mass storage medium, represented for illustrative purposes only as a disk 57, would be accessible from any processor connected to the network. One such configuration would include assigning a unique IP address or other network address to each mass storage medium.

The configurations as exemplified by those shown in FIGS. 1 and 6-8 represent only examples of the various computer and network configurations with which the present invention would be compatible and highly useful. Others would be apparent to those having skill in the art and the present invention is not intended to be limited through the examples as shown herein which are meant to be instead illustrative of the versatility of the present invention.

Figure 9:
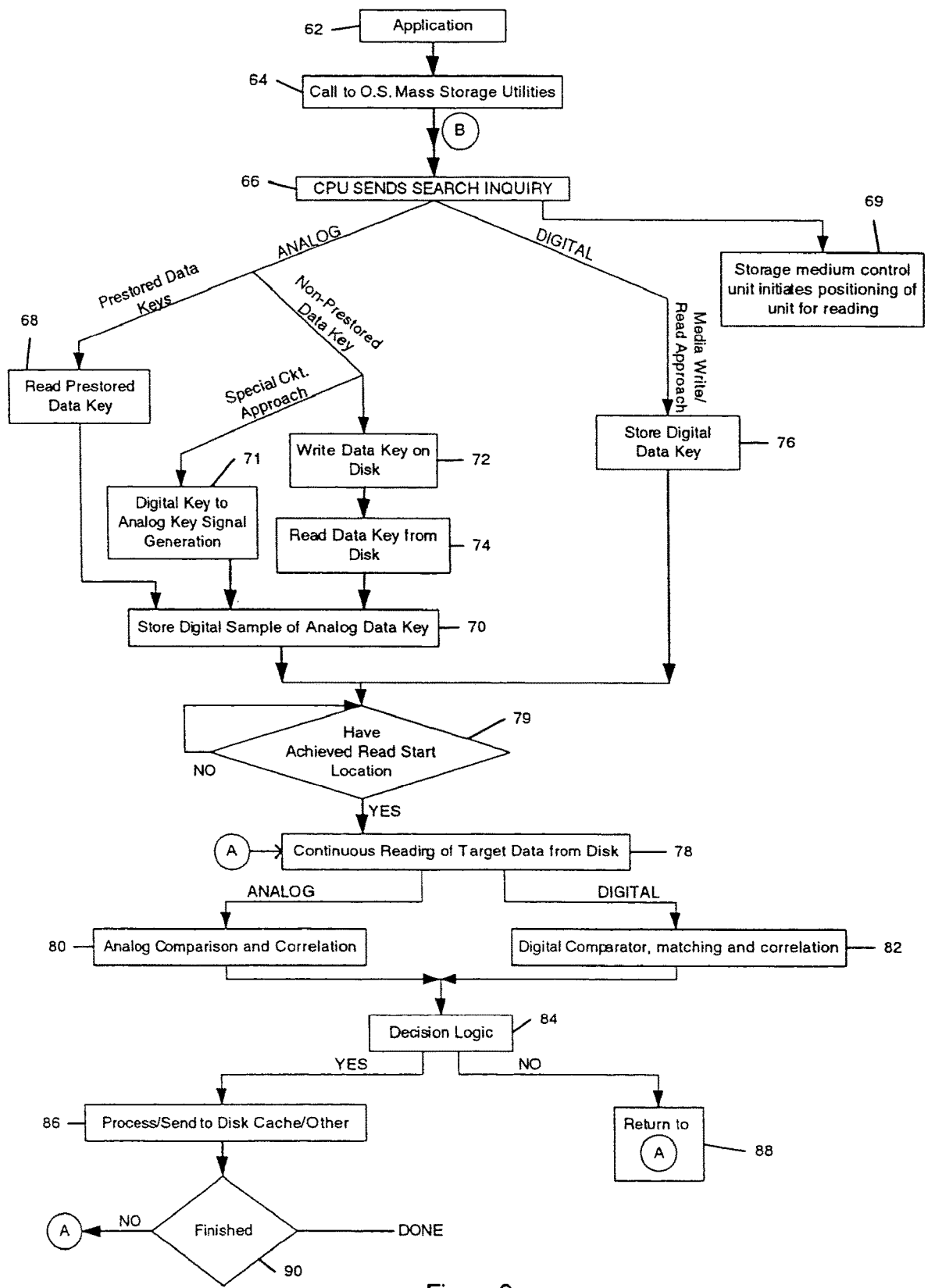
FIG. 9 is a flowchart detailing the logical steps in the inventive method for searching and retrieving data from a magnetic storage medium.

As shown in FIG. 9, the method of the present invention for use in exact or approximate matching is described alternatively with respect to whether an analog or digital data domain is being searched. However, beginning at the start of the method, a CPU performs certain functions during which it may choose to access target data stored in a mass storage medium. Typically, the CPU runs a search inquiry application 62 which may be representative of a DNA search, an Internet search, an analog voice search, a fingerprint search, an image search, or some other such search during which an exact or approximate match to target data is desired. The search inquiry contains directives specifying various parameters which the disk control unit 28 and the re-configurable logic device 20 must have to properly obtain the data key from the mass storage medium 26. Examples of parameters include but are not limited to the following: the starting location for scanning the storage device; the final location after which (if there is not match) scanning is terminated; the data key to be used in the scanning; a specification of the approximate nature of the matching; and what information should be returned when a match occurs. The sort of information that can be returned includes the address of the information where the match was found, or a sector, record, portion of record or other data aggregate which contains the matched information. The data aggregate may also be dynamically specified in that the data returned on a match may be specified to be between bounding data specifiers with the matched data contained within the bounding field. As the example in FIG. 5 shows, looking for the word "bagdad" in a string of text might find the approximate match, due to misspelling, of the word "Baghdad", and return a data field which is defined by the surrounding sentence. Another query parameter would indicate whether the returned information should be sent to the system or input/output bus 34, or the disk cache 30.

Referring back to FIG. 9, the search inquiry will typically result in the execution of one or more operating system utilities. As an example of a higher level utility command, for the UNIX operating system, this could be modified versions of glimpse, find, grep, apropos, etc. These functions cause the CPU to send commands 66 such as search, approximate search, etc., to the re-configurable logic device 21 with relevant portions of these commands also being sent to the disk controller 28 to, for example, initiate any mass storage medium positioning activity 69 that is later required for properly reading target data from the mass storage medium.

At this point, depending upon the particular methodology desired to be implemented in the particular embodiment of the invention, it would be necessary that an analog or digital data key is determined. This data key, which can be either exact or approximate for a text search, corresponds to the data being searched for. For an analog data key, it may either be pre-stored such as in the mass storage medium, developed using dedicated circuitry, or required to be generated. Should the analog data key be pre-stored, a send pre-stored data key step 68 would be performed by the microprocessor 22 (see FIG. 1) which would transmit the data key in digital and sampled format to the re-configurable logic device 20 as shown in step 70. Alternatively, should the analog data key not be pre-stored, it can be developed using one of a number of mechanisms, two of which are shown in FIG. 9. In one, the microprocessor 22 would write the data key on the magnetic mass storage medium as at step 72 and then next read the data key as at step 74 in order to generate an analog signal representation of the data key. In another, as at step 71, the digital version of the data key received from the CPU would be converted using appropriate digital to analog circuitry to an analog signal representation which would in turn be appropriately sampled. The data key would then next be stored as a digital sample thereof as in step 70. Should a digital data key be used, it is only necessary that the microprocessor 22 store the digital data key as at step 76 in the compare register of the re-configurable logic device. It should be understood that depending upon the particular structures desired to be included for each re-configurable logic device, the data key may reside in either or all of these components, it merely being preferable to ultimately get the appropriate digital format for the data key into the re-configurable logic device 21 for comparison and correlation.

Next, after the mass storage medium 26 reaches its starting location as at 79, the target data stored on the mass storage medium is continuously read as at step 78 to generate a continuous stream signal representative of the target data. Should an analog data key have been used, this analog data key may then be correlated with an analog read of the target data from the mass storage medium 26 as at step 80.

While the inventors contemplate that any of many prior art comparators and correlation circuitry could be used, for present purposes the inventors suggest that a digital sampling of the analog signal and data key could be quite useful for performing such comparison and calculating the correlation coefficient, as explained below. It is noted that this analog signal generated from reading the target data from mass storage medium 26 may be conveniently generated by devices in the prior art from the reading of either analog or digital data, it not being necessary that a digital data key be used to match digital target data as stored in mass storage medium 26. Alternatively, a correlation step 82 may be performed by matching the digital data key with a stream of digital target data as read from the mass storage medium 26. It should be noted that the data key may reflect the inclusion of approximate information or the re-configurable logic device 21 may be programmed to allow for same. Thus, correlating this with target data read from the mass storage medium enables approximate matching capabilities.

Referring back to FIG. 9, decision logic 84 next makes an intelligent decision as to whether a portion of the target data approximately matches or does not approximately match the data key. Should a match be found, then the target data is processed as at step 86 and the key data requested by the search inquiry is sent to a disk cache 30, directly onto system bus 34, or otherwise buffered or made available to a CPU 32, network interface 36, or otherwise as shown in FIGS. 1, and 6-8. A logical step 88 is preferably included for returning to the continuous reading of target data from the mass storage medium 26, indicating something like a "do" loop. However, it should be understood that this is a continuous process and that target data is processed from the mass storage medium 26 as a stream and not in individualized chunks, frames, bytes, or other predetermined portions of data. While this is not precluded, the present invention preferably allows a data key to be in essence "slid" over a continuously varying target data read signal such that there is no hesitation in reading target data from the mass storage medium 26. There is no requirement to synchronize reading to the start or end of any multi-bit data structure, or any other intermediate steps required to be performed as the target data is compared continuously "on the fly" as it is read from the mass storage medium 26. Eventually, the data access is completed as at step 90 and the process completed.

Figure 10:
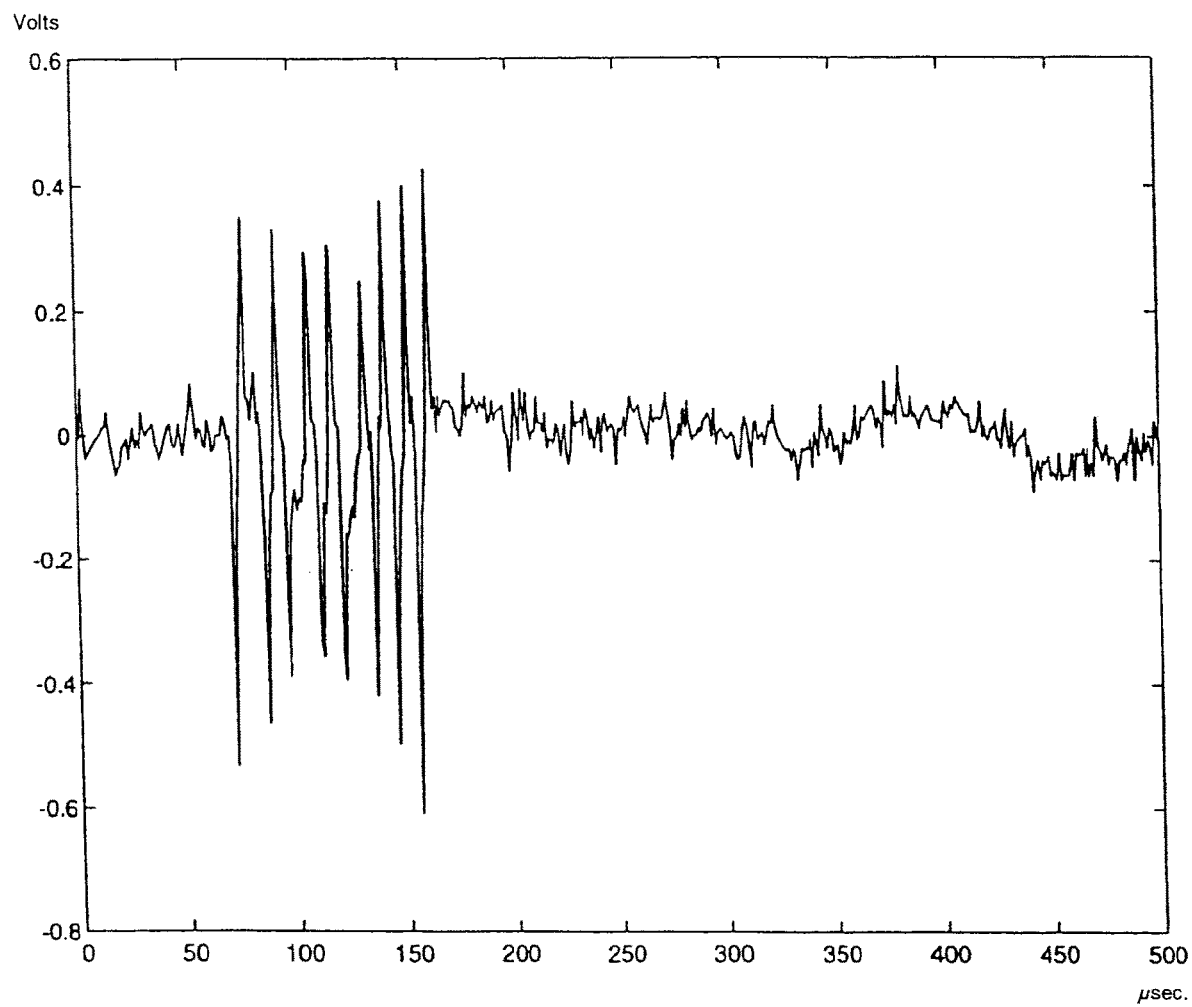
FIG. 10 is a graphical representation of an analog signal as might be used as a data key.
Figure 11:
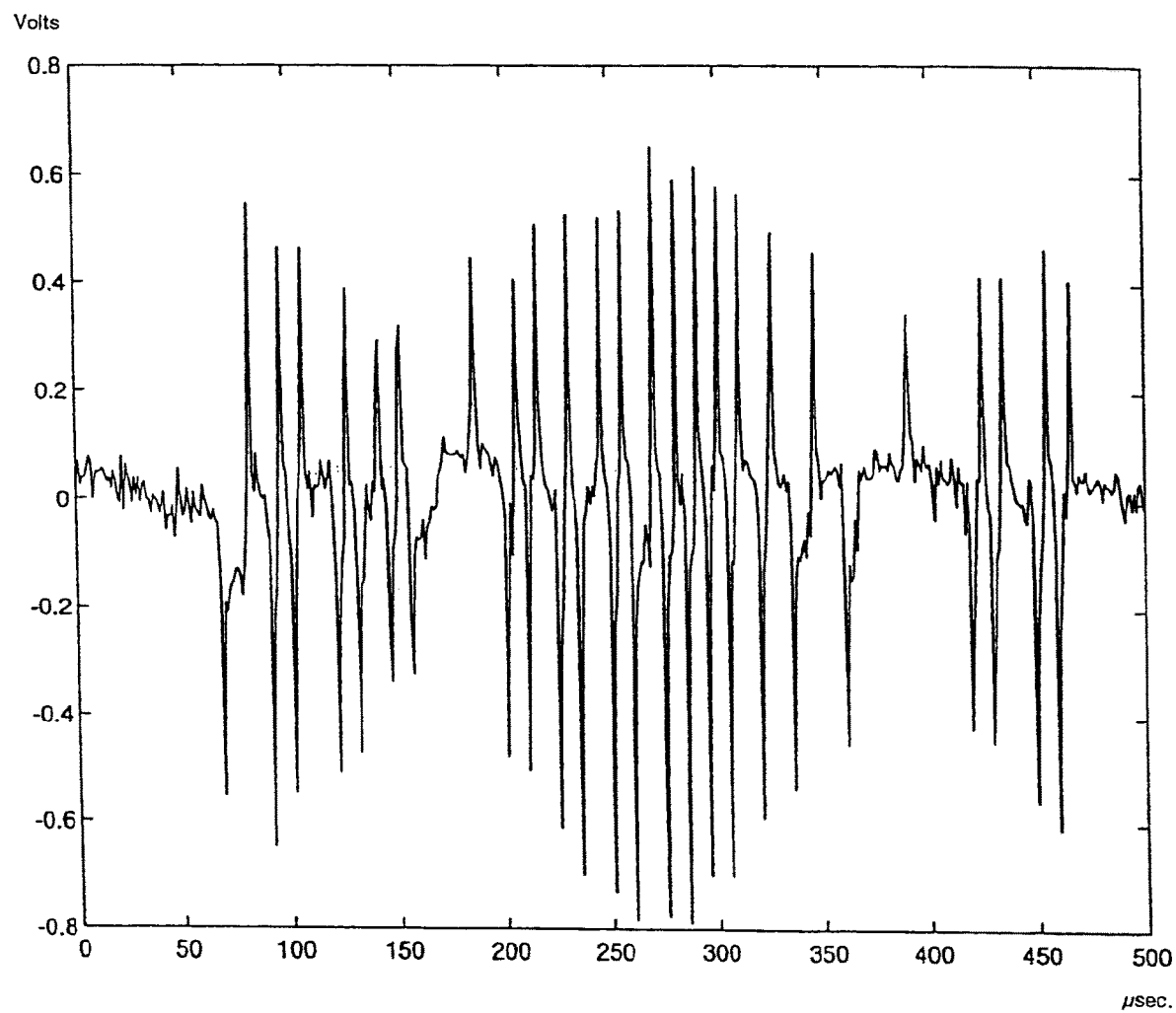
FIG. 11 is a graphical representation of an analog signal representing the continuous reading of data from a magnetic storage medium in which the data key is present.

The inventors herein have preliminarily tested the present invention in the analog domain and have generated preliminary data demonstrate its operability and effectiveness. In particular, FIG. 10 is a graphical representation of a measured analog signal output from a read/write head as the read/write head reads a magnetic medium on which is stored a 10-bit digital data key. As shown therein, there are peaks in the analog signal which, as known in the art, represents the true analog signal generated by a read/write head as target data is read from a magnetic medium such as a hard disk. The scales shown in FIG. 10 are volts along the vertical axis and tenths of microseconds along the horizontal axis. As shown in FIG. 11, an analog signal is generated, again by a read/write head, as target data is read from a pseudo-random binary sequence stored in a test portion of a magnetic medium. The read signal does not provide an ideal square wave output when examined at this level.

Figure 12:
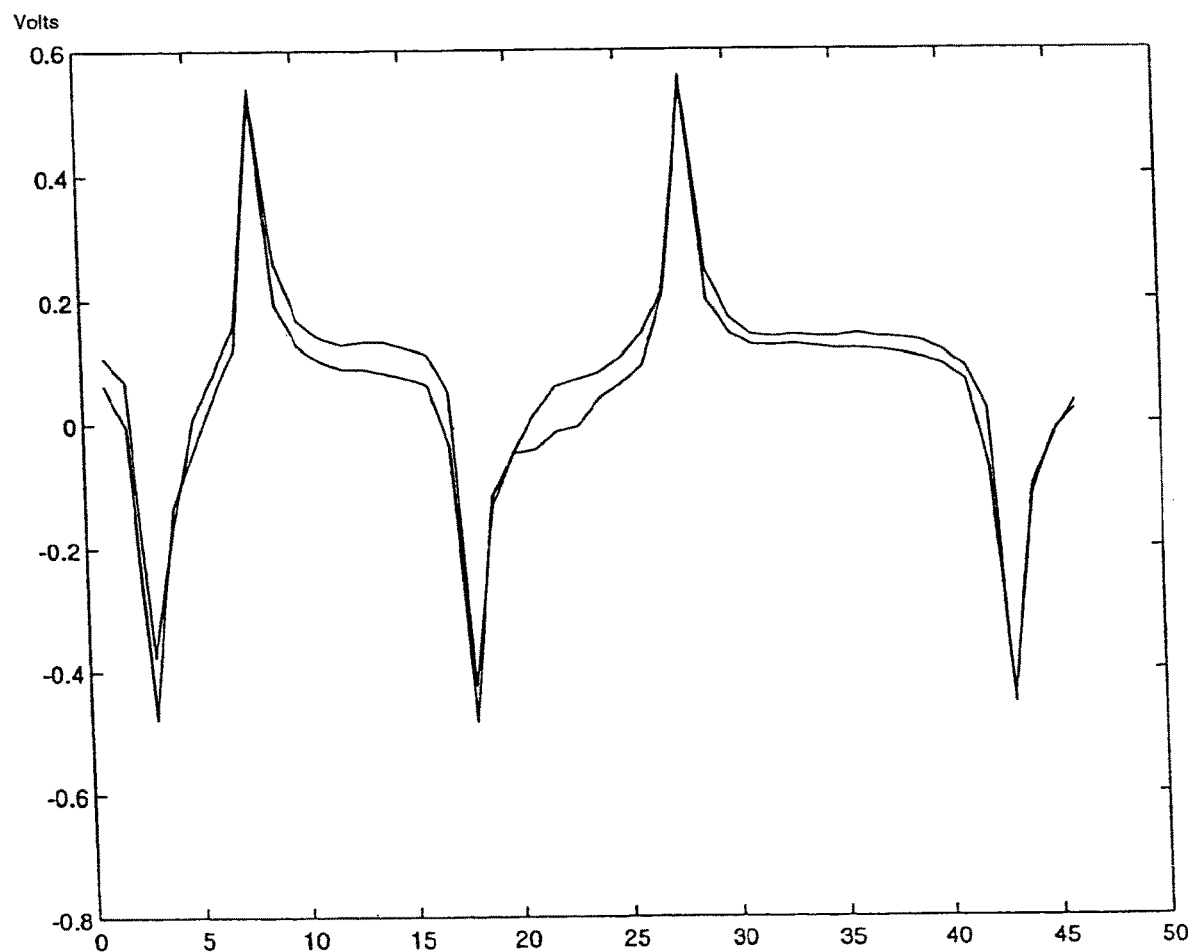
FIG. 12 is a graphical representation of the signal of FIG. 10 overlying and matched to the signal of FIG. 11.

FIG. 12 is a graphical representation, with the horizontal scale expanded, to more specifically illustrate the overlap between approximately two bits of the 8-bit data key and the corresponding two bits of target data found in the pseudo-random binary sequence encoded at a different location on the disk or magnetic medium.

Figure 13:
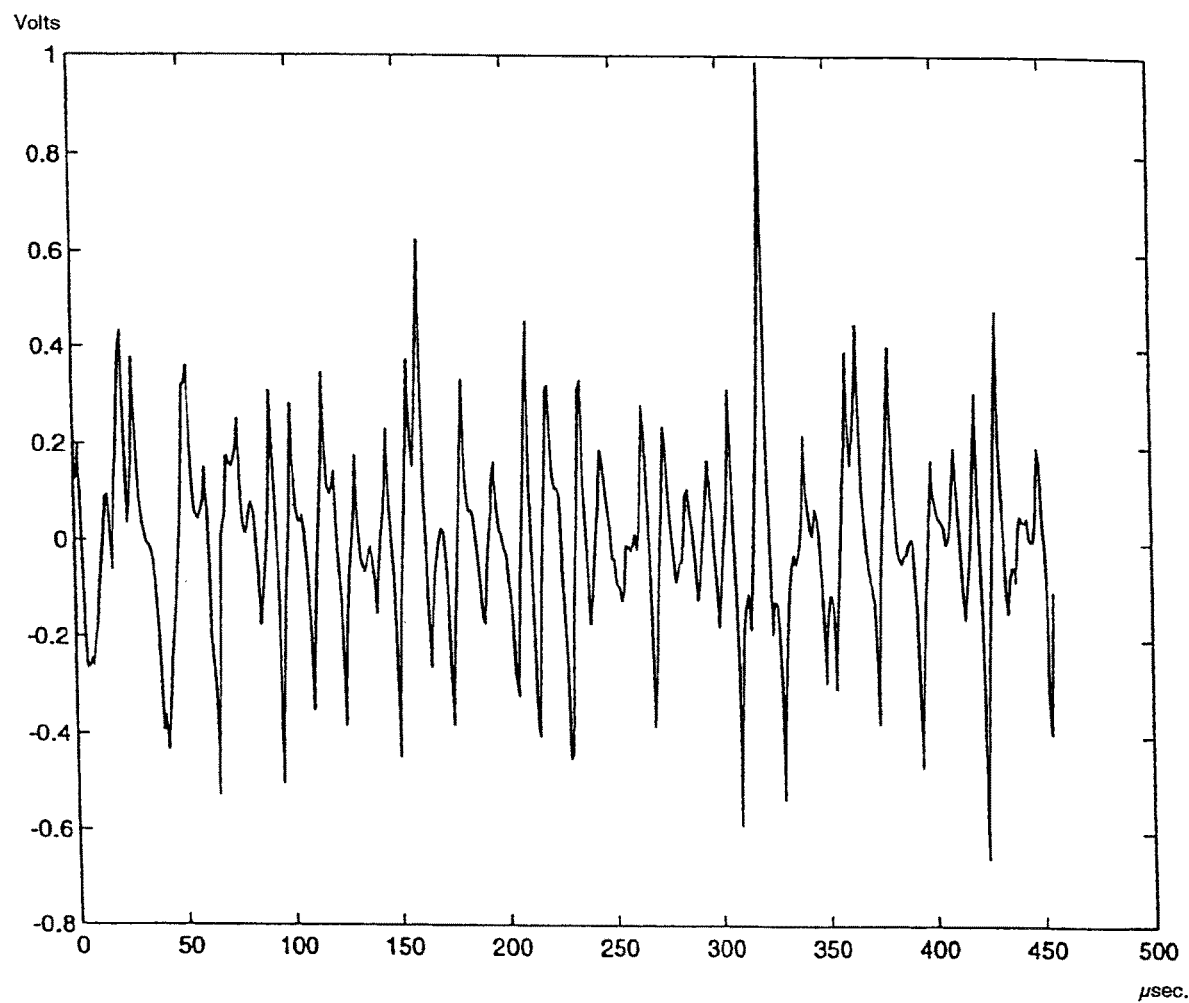
FIG. 13 is a graphical representation of a correlation function calculated continuously as the target data in the magnetic storage medium is scanned and compared with the data key.

FIG. 13 is a graphical representation of a correlation coefficient calculated continuously as the comparison is made between the data key and the continuous reading of target data from the hard disk. This correlation coefficient is calculated by sampling the analog signals at a high rate and using prior art signal processing correlation techniques. One such example may be found in Spatial Noise Phenomena of Longitudinal Magnetic Recording Media by Hoinville, Indeck and Muller, IEEE Transactions on Magnetics, Volume 28, no. 6, November 1992, the disclosure of which is incorporated herein by reference. A prior example of a reading, comparison, and coefficient calculation method and apparatus may be found in one or more of one of the co-inventor's prior patents, such as U.S. Pat. No. 5,740,244, the disclosure of which is incorporated herein by reference. The foregoing represent examples of devices and methods which may be used to implement the present invention, however, as mentioned elsewhere herein, other similar devices and methods may be likewise used and the purposes of the invention fulfilled.

As shown in FIG. 13, at approximately the point labeled 325, a distinct peak is noted at approximately 200 microseconds which approaches 1 Volt, indicating a very close match between the data key and the target data. FIG. 10 is also illustrative of the opportunity for approximate matching which is believed to be a powerful aspect of the present invention. Looking closely at FIG. 13, it is noted that there are other lesser peaks that appear in the correlation coefficient. Thus, if a threshold of 0.4 Volts were established as a decision point, then not only the peak occurring which approaches 1 would indicate a match or "hit" but also another five peaks would be indicative of a "hit". In this manner, a desired coefficient value may be adjusted or predetermined as desired to suit particular search parameters. For example, when searching for a particular word in a large body of text, lower correlation values may indicate the word is present but misspelled.

Figure 14:
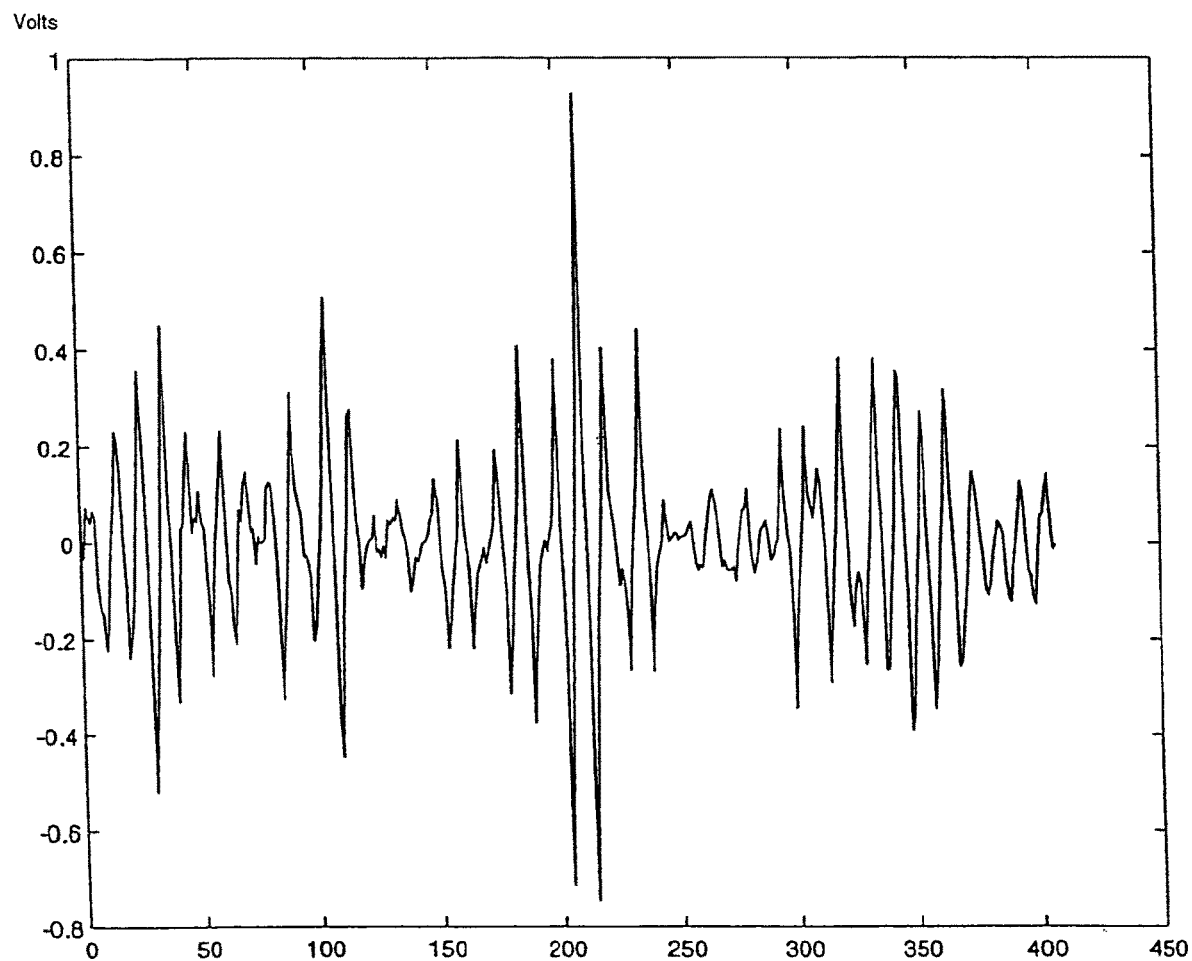
FIG. 14 is a graphical representation of a correlation function as the data key is continuously compared with a signal taken from reading a different set of target data from the magnetic storage medium but which also contains the data key.

FIG. 14 depicts the continuous calculation of a correlation coefficient between the same 8-bit data key but with a different target data set. Again, a single match is picked up at approximately 200 microseconds where the peak approaches 1 Volt. It is also noted that should a lower threshold be established additional hits would also be located in the target data.

Figure 15:
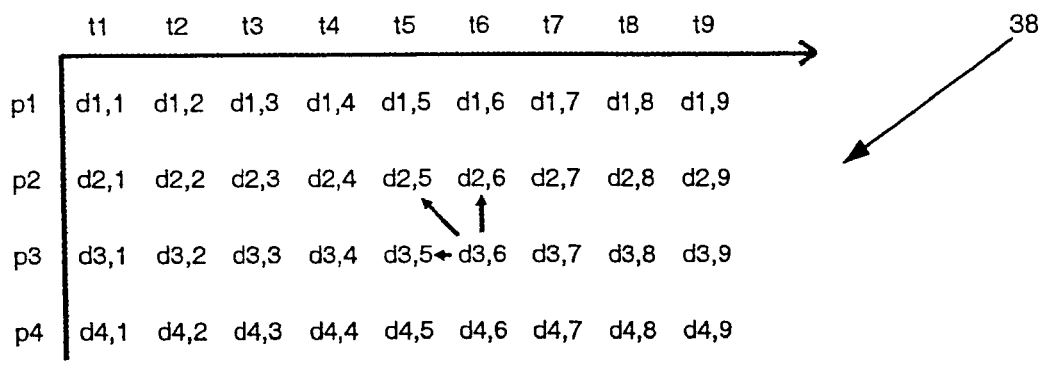
FIG. 15 is one embodiment of a table generated by the present invention for use in performing sequence matching operations.

As previously mentioned, the present invention is also capable of performing sequence matching searches. With reference to FIG. 15, a table 38 is generated by the re-configurable logic device 20 to conduct such a search. Specifically, $p_1 p_2 p_3 p_4$ represents the data key, p, or desired sequence to be searched. While the data key of FIG. 15 only shows four characters, this is for illustrative purposes only and it should be appreciated that a typical data key size for sequence searching is on the order of 500-1000, or even higher. The symbols $t_1, t_2, t_3 \ldots t_9$ represent the target data, t, streaming off of the mass storage medium 26. Again, while only nine (9) characters of such data are shown, it should be appreciated that the typical size of the mass storage medium 26 and thus the target data streaming off of it can typically be in the range of several billion characters. The symbols represent the edit distance at position i in the data key and position j in the target data. It is assumed that the data key is shorter relative to the target data, although it is not required to be so. There may be a set of known (constant) values for an additional row (d0,j) and column (di,0) not shown in FIG. 15.

The values for di,j are computed by the re-configurable logic device 20 using the fact that di,j is only a function of the following characters: (1) pi, (2) tj, (3) di−1,j−1, (4) di−1,j, and (5) di,j−1. This is illustrated in FIG. 15 with respect to the position d3,6 by showing its dependency on the values of d2,5 and d2,6 and d3,5 as well as p3 and t6. In one embodiment, the values for di,j are computed as follows:

$$di,j=\max[di,j-1+A; di-1,j+A; di-1,j-1+Bi,j],$$

where A is a constant and Bi,j is a tabular function of pi and tj. The form of the function, however, can be quite arbitrary. In the biological literature, B is referred to as the scoring function. In the popular database searching program BLAST, scores are only a function of whether or not pi=tj. In other contexts, such as for amino acid sequences, the value of B is dependent upon the specific characters in p and t.

Figure 16:
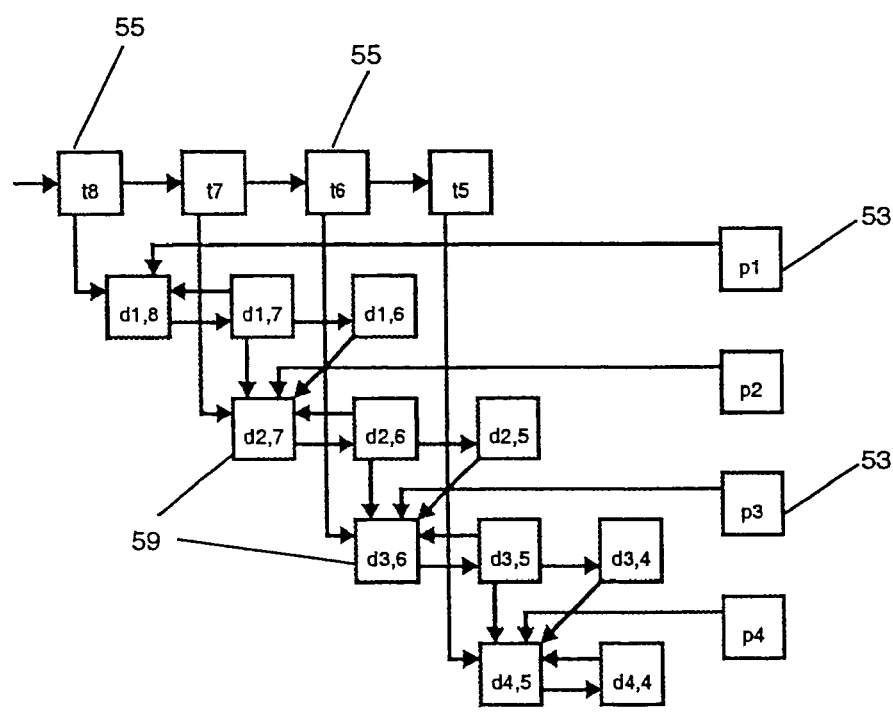
FIG. 16 is a block diagram of one embodiment of a systolic array architecture used by the present invention for computing the values of the table of FIG. 15.

FIG. 16 shows one embodiment of a systolic array architecture used by the present invention to compute the values in the table 38 of FIG. 15. The characters of the data key are stored in the column of data registers 53, while the characters of the target data streaming off of the mass storage medium 26 are stored in the data shift registers 55. The values of di,j are stored in the systolic cells 59 which themselves are preferably FPGA's.

Figure 17:
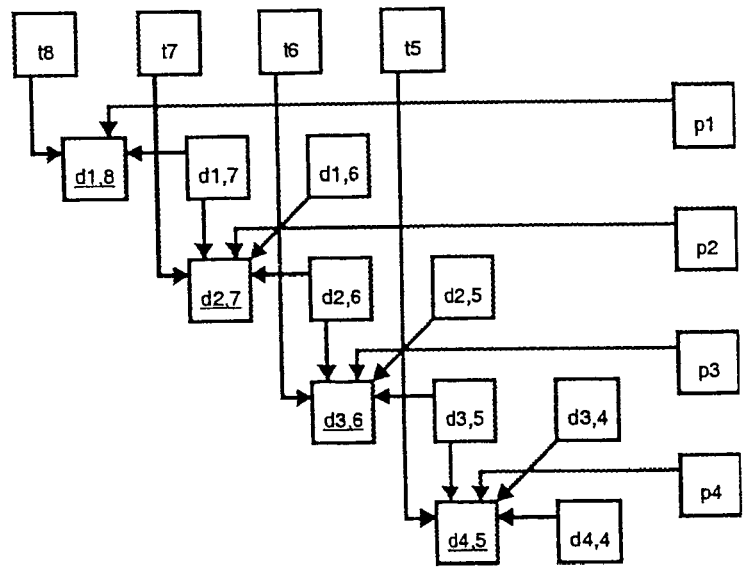
FIGS. 17 and 18 are block diagrams of the systolic array architecture of FIG. 15 in operation during the combinational and latch part of the clock cycle, respectively, of the system of FIG. 1.
Figure 18:
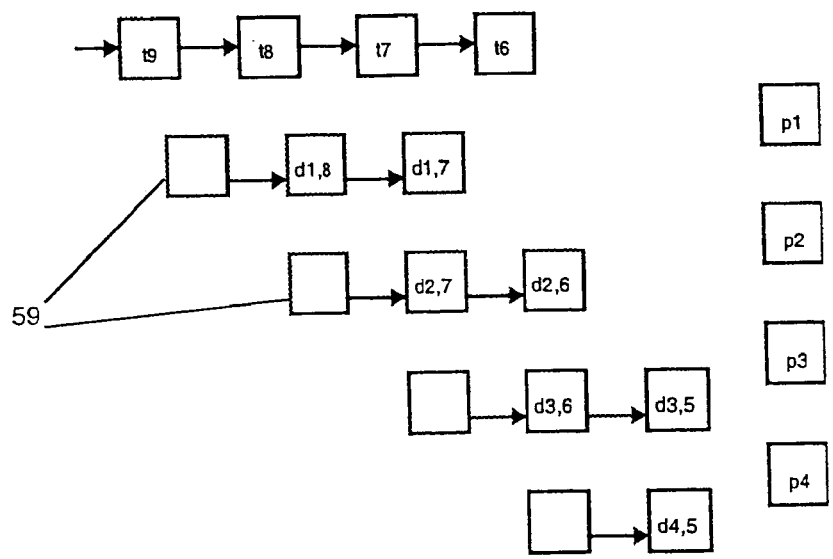

The operation of the array of FIG. 16 will now be illustrated using FIGS. 17 and 18. As shown in FIG. 17, in the first (i.e., combinational) part of the clock cycle of the system, the four underlined values are computed. For example, the new value d3,6 is shown to depend upon the same five values illustrated earlier in FIG. 15. As shown in FIG. 18, in the second (i.e., latch) part of the clock cycle, all the characters in di,j and tj are shifted one position to the right. A comparator 61 is positioned at each diagonal cell of the d array and determines when the threshold has been exceeded.

The sequence matching operation will now be described with reference to FIGS. 19-22 with respect to the following example:

key=axbacs
target data=pqraxabcstvq
A=1
B=2, if i=j
B=−2 if i≠j

From these variables, the table of FIG. 19 is generated by the re-configurable logic device 20. Assuming a pre-determined threshold of "8", the re-configurable logic device 20 will recognize a match at d6,9.

Figure 20:
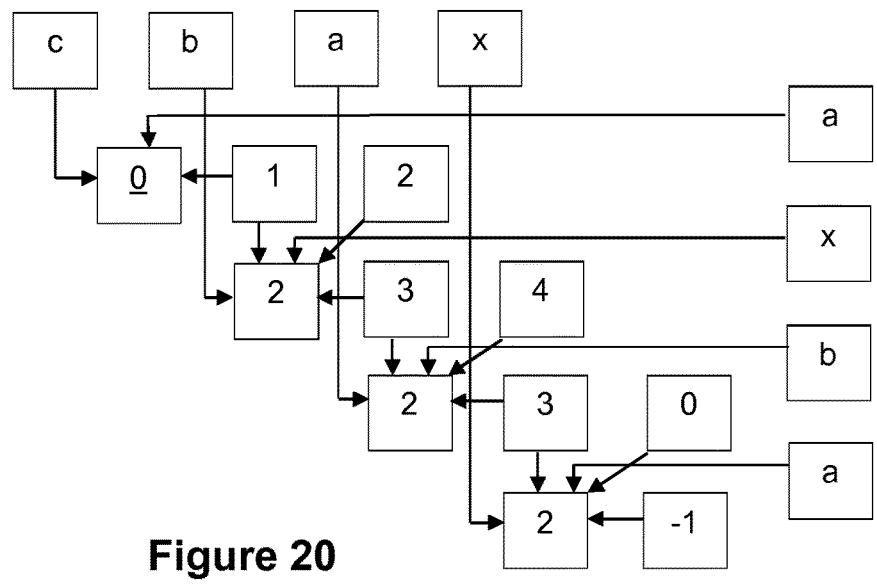
FIG. 20 is a block diagram of the systolic array architecture of FIG. 16 for the example of FIG. 19.
Figure 21:
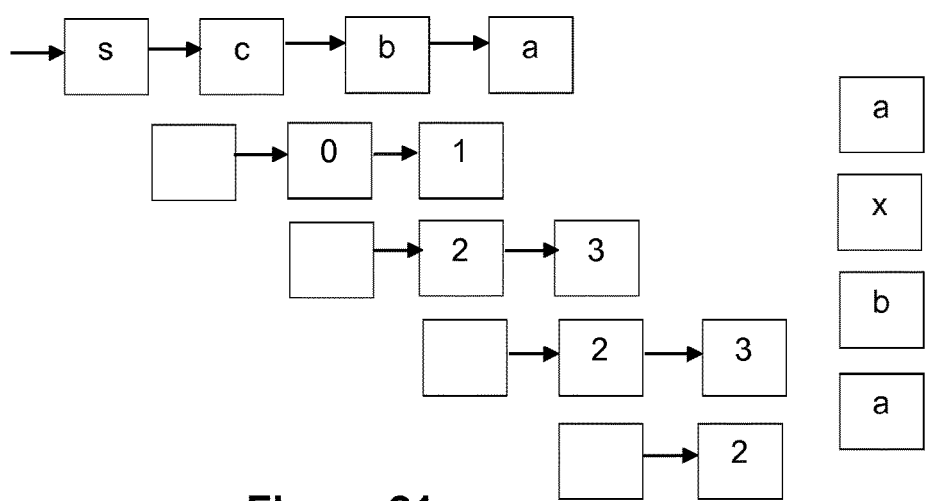
FIGS. 21 and 22 are block diagrams of the systolic array architecture of FIG. 20 in operation during the combinational and latch part of the clock cycle, respectively, of the system of FIG. 1.
Figure 22:
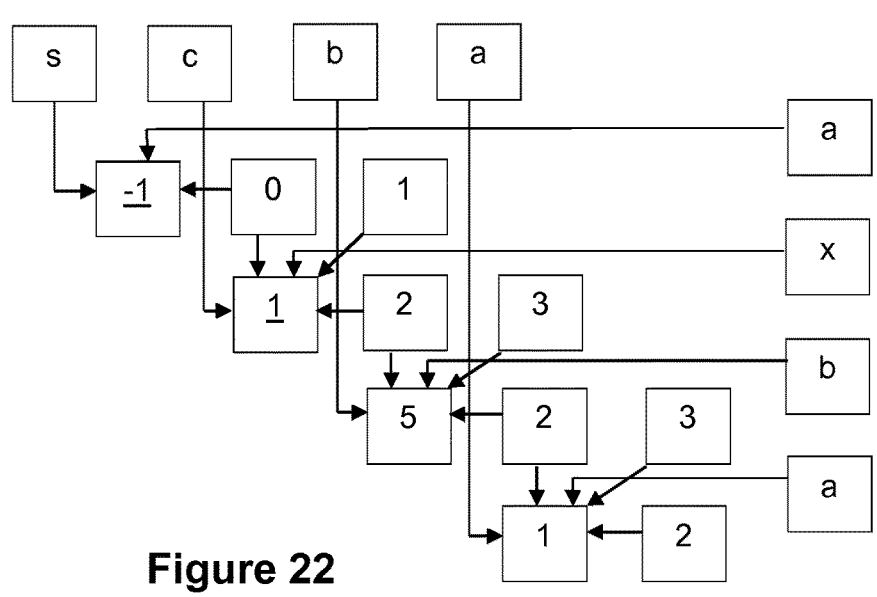

A portion of the synthesis arrays representing the values present in FIGS. 16-18 for this example are shown in FIGS. 20-22, respectively. A match is identified by the re-configurable logic device 20 when the value on any row exceeds a predetermined threshold. The threshold is set based on the desired degree of similarity desired between the data key and the target data stored in mass memory device 26. For example, in the case of an exact match search, the data key and target data must be identical. The match is then examined by the CPU 32 via a traceback operation with the table of FIG. 19. Specifically a "snapshot" of the table is sent to the CPU 32 at a predetermined time interval to assist in traceback operations once a match is identified. The interval is preferably not too often to overburden the CPU 32, but not so infrequent that it takes a lot of time and processing to recreate the table. To enable the CPU 32 to perform the traceback operation, it must be able to recreate the d array in the area surrounding the entry in the table that exceeded the threshold. To support this requirement, the systolic array can periodically output the values of a complete column of d ("a snapshot") to the CPU 32. This will enable the CPU 32 to recreate any required portion of d greater than the index j of the snapshot.

Figure 23:
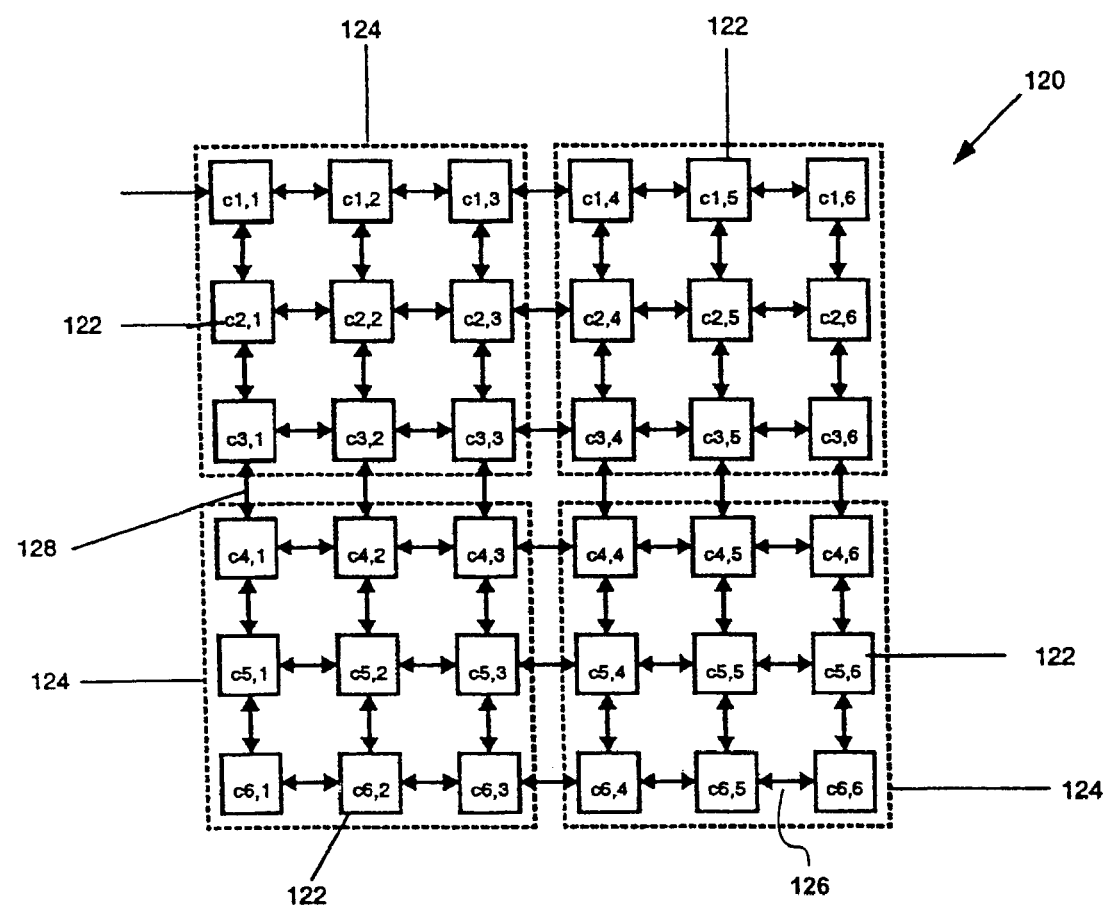
FIG. 23 is a block diagram of one embodiment of a systolic array architecture used by the present invention in performing image matching operations.

Many matching applications operate on data representing a two dimensional entity, such as an image. FIG. 23 illustrates a systolic array 120 of re-configurable logic devices 20, preferably FPGA's, which enables matches on two dimensional data. The individual cells 122 each hold one pixel of the image for which the user is desiring to match (the image key) and one pixel of the image being searched (the target image). For images of sufficiently large size, it is likely they will not all fit into one re-configurable logic chip 124. In such cases, a candidate partitioning of cells to chips is shown with the dashed lines, placing a rectangular subarray of cells in each chip 124. The number of chip-to-chip connections can be minimized by using a subarray that is square (i.e., same number of cells in the vertical and horizontal dimension). Other more complicated arrangements are shown below.

Figure 24:
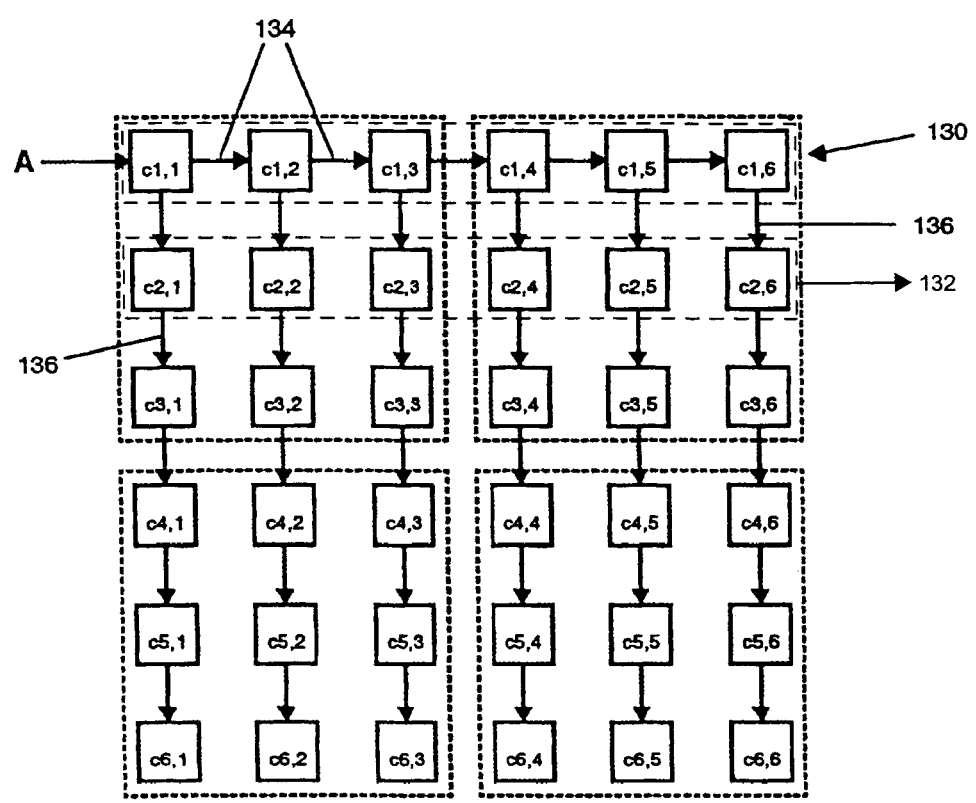
FIG. 24 is a block diagram of another arrangement for the systolic array architecture in performing image matching operations.

Loading of the target image into the array 120 is explained using FIG. 24. Individual rows of each target image streaming off the mass magnetic medium 26, shown generally as point A, into the top row 130 of the array via the horizontal links 134 connecting each cell. With such a configuration, the top row 130 operates as a data shift register. When the entire row 130 is loaded, the row is shifted down to the next row 132 via the vertical links 136 shown in each column. Once the entire image is loaded into the array, a comparison operation is performed, which might require arbitrary communication between neighboring cells. This is supported by both the horizontal and vertical bi-directional links 126 and 128, respectively, shown in FIG. 23.

Figure 28:
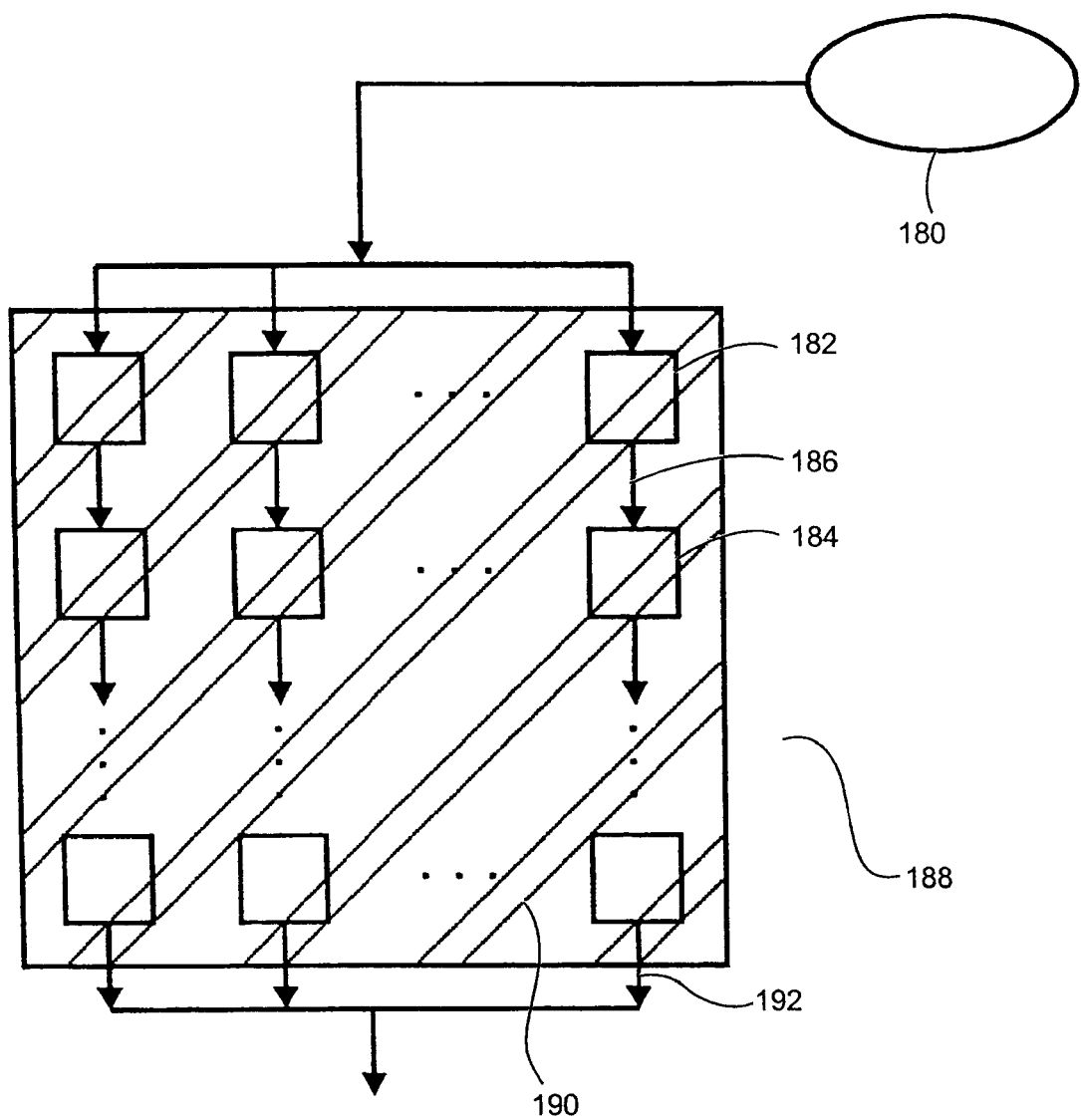
FIG. 28 is a block diagram showing a more complex arrangement of FPGA's.

Although for simplicity purposes the individual bi-directional links 126 and 128 are shown simply in FIGS. 23 and 24, FIG. 28 shows the flexibility for implementing a much more complex set of bi-directional links. As shown in FIG. 28, data may be communicated from a mass storage medium 180 and be input to a first row of a plurality of cells 182, with each cell of the first row having a direct link to the corresponding cell 184 below it in a second row of cells with a simple link 186, and so on throughout the array 188 of cells. Overlying the array 188 of cells is a connector web 190 which provides direct connectivity between any two cells within the array without the need for transmission through any intervening cell. The output of the array 188 is represented by the sum of the exit links 192 at the bottom of the array 188. It should be understood that each cell in the array may be comprised of an FPGA, each one of which preferably has a re-configurable logic element corresponding to element 20 in FIG. 1, or any one of which may have a re-configurable logic element 20 as well as a data shift register 24, or any one of which may have the entirety of re-configurable logic device 21.

Figure 25:
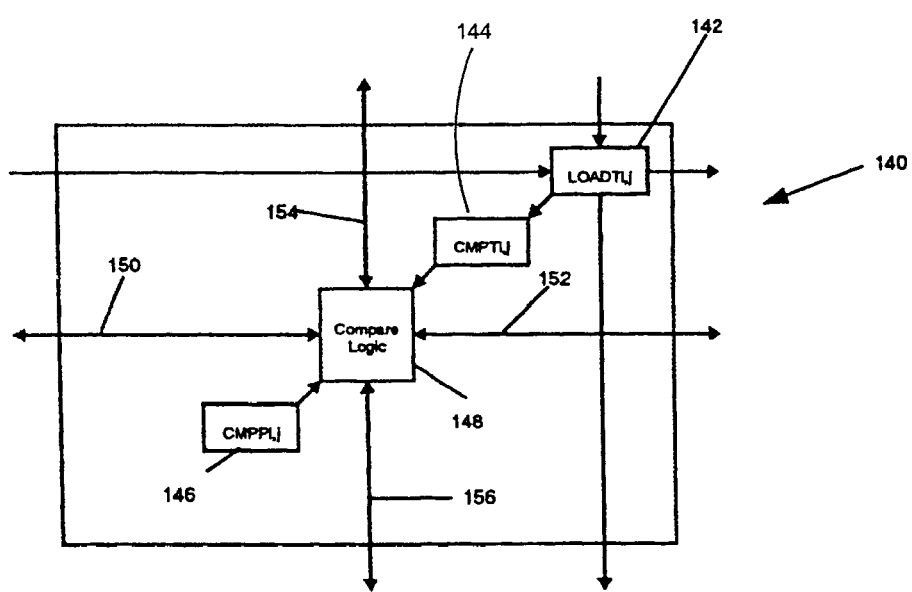
FIG. 25 is a block diagram of one embodiment of an individual cell of the systolic array shown in FIG. 23.

One embodiment for the individual cells of array 120 is illustrated in FIG. 25. The cell 140 includes a pixel register 142, LOADTi,j, which contains the pixels of the target image currently being loaded into the array. A register, 144 CMPTi,j, contains a copy of the pixel register 142 once the complete target image has been loaded. This configuration enables the last target image loaded to be compared in parallel with the next target image being loaded, essentially establishing a pipelined sequence of load, compare, load, compare, etc. A register 146, CMPPi,j, contains the pixels of the image key to be used for comparison purposes, and the compare logic 148 performs the matching operation between register 144 and register 146. The compare logic 148 may include the ability to communicate with the neighboring cells to the left, right, up, and down shown generally as 150, 152, 154, and 156, respectively, to allow for complex matching functions.

Figure 26:
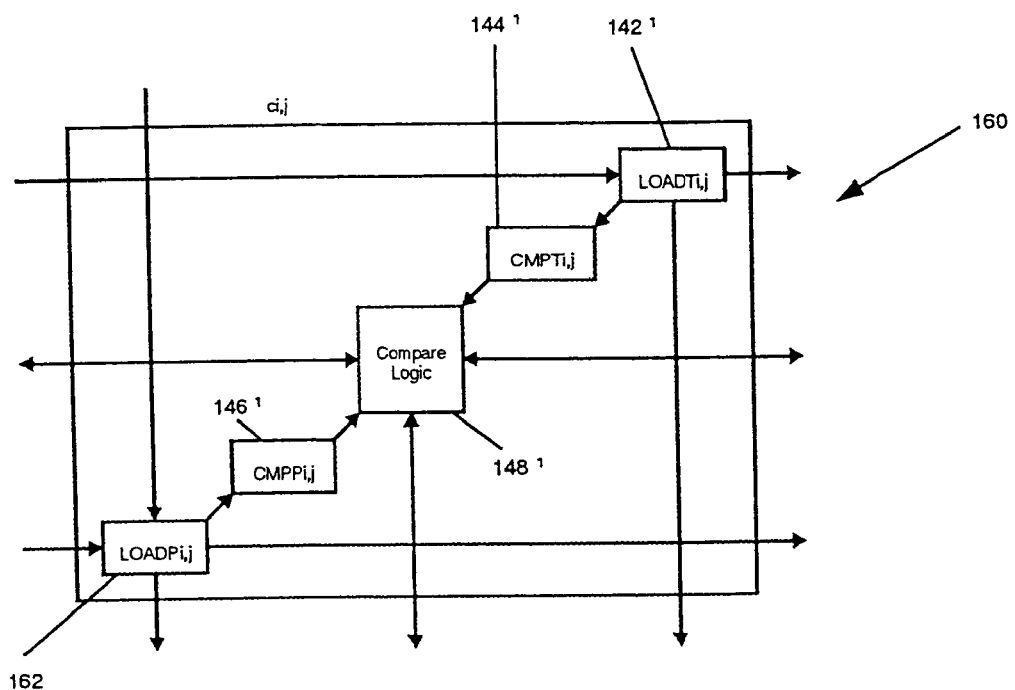
FIG. 26 is a block diagram of another embodiment of an individual cell of the systolic array shown in FIG. 23.

Another embodiment for the individual cells of array 120 of FIG. 23 is illustrated in FIG. 26. The cell 140 of FIG. 25 has been augmented to support simultaneous loading of the image key and the target image. In particular, the cell 160 includes the same components of the cell 140, but adds a new register 162, LOADPi,j, which is used to load the image key, and is operated in the same manner as register 142. With such a configuration, if one disk read head of the mass storage medium 26 is positioned above the image key, and a second disk read head is positioned above the target image, they can both flow off the disk in parallel and be concurrently loaded into the array 160.

The operation performed within the compare logic block can be any function that provides a judgment as to whether or not there are significant differences between the target image and the image key. An example includes cross-correlations across the entire image or sub-regions of the image as described in John C. Russ, *The Image Processing Handbook*, 3$^{rd}$ edition, CRC Press 1999, which is incorporated herein by reference.

The present invention is also capable of performing data reduction searching. Such searching involves matching as previously described herein, but includes summarizing the matched data in some aggregate form. For example, in the financial industry, one might want to search financial information to identify a minimum, maximum, and latest price of a stock. A re-configurable logic device for computing such aggregate data reductions is illustrated as 100 in FIG. 27. Here, a data shift register 102 reads target data from a mass storage medium containing stock price information. In the example shown, three data reduction searches are shown, namely calculating the minimum price, the maximum price, and the latest price. As target data is fed into the data shift register 102, decision logic computes the desired data reduction operation. In particular, the stock price is fed to a minimum price comparator 110 and maximum price comparator 112 and stored therein. Each time a stock price is fed to comparator 110, it compares the last stored stock price to the stock price currently being fed to it and whichever is lower is stored in data register 104. Likewise, each time a stock price is fed to comparator 112, it compares the last stored stock price to the stock price currently being fed to it and whichever is higher is stored in data register 106. In order to compute the latest price, the stock price is fed into a data register 108 and the current time is fed into a comparator 114. Each time a time value is fed into comparator 114, it compares the last stored time with the current time and which ever is greater is stored in data register 116. Then, at the end of the desired time interval for which a calculation is being made, the latest price is determined.

Figure 27:
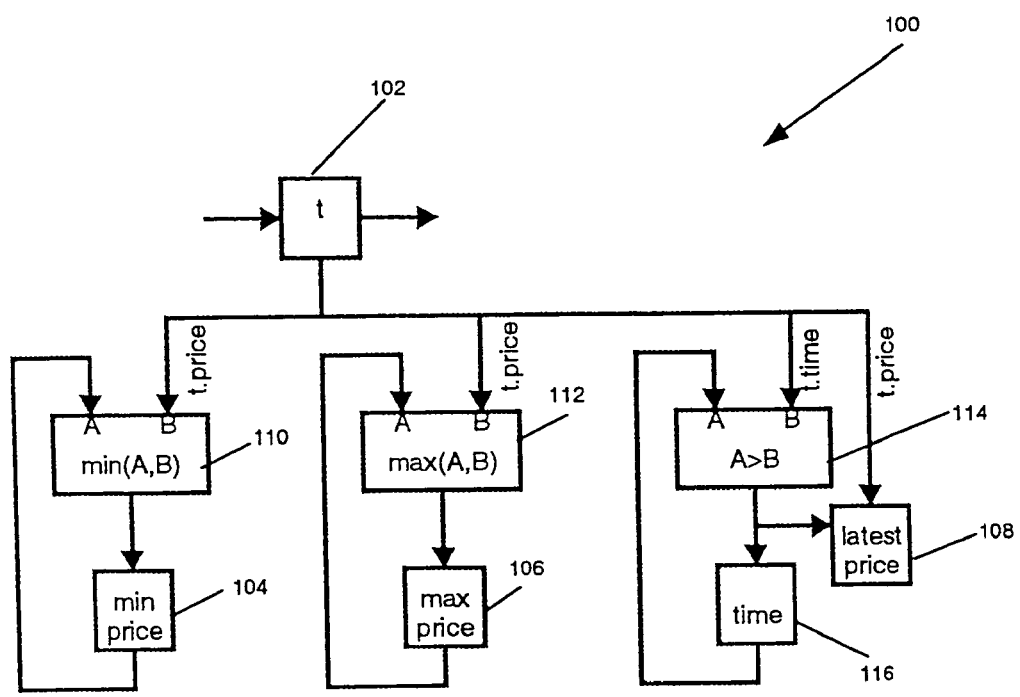
FIG. 27 is a block diagram showing an example using the present invention for performing data reduction operations.

While data reduction searching has been described with respect to the very simple financial example shown in FIG. 27, it can be appreciated that the present invention can perform data reduction searching for a variety of different applications of varying complexity requiring such functionality. The re-configurable logic device need simply be configured with the hardware and/or software to perform the necessary functions The ability to perform data reduction searching at disk rotational speeds cannot be under-estimated. One of the most valuable aspects of information is its timeliness. People are growing to expect things at Internet speed. Companies that can quickly compute aggregate data reductions will clearly have a competitive advantage over those that cannot.

Various changes and modifications to the present invention would be apparent to those skilled in the art but yet which would not depart from the spirit of the invention. The preferred embodiment describes an implementation of the invention but this description is intended to be merely illustrative. Several alternatives have been also been above. For example, all of the operations exemplified by the analog processing have their equivalent counterparts in the digital domain. Thus, approximate matching and correlation types of processing can be done on the standard digital representation of the analog bit patterns. This can also be achieved in a continuous fashion using tailored digital logic, microprocessors and digital signal processors, or alternative combinations. It is therefore the inventors' intention that the present invention be limited solely by the scope of the claims appended hereto, and their legal equivalents.

What is claimed is:

1. An apparatus for financial information data reduction searching, the apparatus comprising:
a field programmable gate array (FPGA) having a hardware template deployed thereon for configuring the FPGA to perform a data reduction operation on streaming financial information, the streaming financial information comprising data representative of a plurality of stocks and data representative of a plurality of prices for the stocks, wherein the FPGA, as configured by the hardware template, comprises matching hardware logic and downstream summarization hardware logic, wherein the matching hardware logic and summarization hardware logic are configured in a pipelined orientation on the FPGA and exist as a configured array of interconnected logic gate units within the FPGA, the interconnected logic gate units comprising an arrangement of a plurality of registers and comparators deployed on the FPGA in the pipelined orientation; and
a processor for cooperation with the FPGA, wherein the processor is free to perform other tasks while the FPGA is processing the streaming financial information;
wherein the matching hardware logic is configured to perform a match operation on the streaming financial information to find matched data within the streaming financial information, wherein the matched data comprises data representative of a plurality of stock prices for a stock;
wherein the summarization hardware logic is configured to generate a price summary of the stock prices within the matched data; and
wherein the matching hardware logic and the summarization hardware logic are configured in the pipelined orientation on the FPGA such that the matching hardware logic and the summarization hardware logic operate simultaneously with each other, the summarization hardware logic being configured to operate on matched data previously found by the matching hardware logic while the matching hardware logic is configured to operate on new streaming financial information, the matching hardware logic and the summarization hardware logic thereby being configured to simultaneously operate together to generate a running computation of the price summary on a streaming basis as the financial information streams through the FPGA.

2. The apparatus of claim 1 wherein the summarization hardware logic comprises a plurality of parallel paths, the parallel paths configured to simultaneously compute, on a streaming basis, a plurality of different price summaries of the stock prices within the matched data.

3. The apparatus of claim 2 wherein the parallel paths comprise:
a first parallel path configured to compute a maximum price for the stock prices within the matched data;
a second parallel path configured to compute a minimum price for the stock prices within the matched data; and
a third parallel path configured to compute a latest price for the stock prices within the matched data.

4. The apparatus of claim 2 wherein the FPGA further includes a data shift register through which the financial information is streamed for processing by the matching hardware logic and the summarization hardware logic.

5. The apparatus of claim 3 wherein the matching hardware logic is configured to (1) store a data key, (2) receive the streaming financial information, and (3) match the received streaming financial information against the data key to find the matched data.

6. The apparatus of claim 5 wherein the hardware template is configured to support a plurality of different matches for the matching hardware logic without requiring that a new hardware template be loaded onto the FPGA, and wherein the processor is further configured to determine a new data key and communicate the new data key to the FPGA for storage therein to thereby modify the matching hardware logic to search for the new data key within the streaming financial information.

7. The apparatus of claim 5 wherein the matching hardware logic and the summarization hardware logic are configured to operate at hardware processing speeds.

8. The apparatus of claim 3 wherein the matching hardware logic and the summarization hardware logic are configured to operate at hardware processing speeds.

9. The apparatus of claim 2 wherein the matching hardware logic and the summarization hardware logic are configured to operate at hardware processing speeds.

10. The apparatus of claim 1 wherein the summarization hardware logic is configured to compute, on a streaming basis, a maximum price for the stock prices within the matched data.

11. The apparatus of claim 10 wherein the summarization hardware logic comprises:
a first register configured to store the stock price data within the matched data, wherein the summarization hardware logic is further configured to stream the stock price data within the matched data through the first register;
a second register configured to store data representative of the maximum price for the stock corresponding to the stock prices streaming through the first register; and
a comparator configured to compare the stock prices streaming through the first register with the maximum price in the second register;
wherein the summarization hardware logic is further configured to update the maximum price in the second register based on the comparison by the comparator as the stock price data streams through the first register to thereby provide a running computation of the maximum price for the stock corresponding to the streaming stock price data in the first register.

12. The apparatus of claim 1 wherein the summarization hardware logic is configured to compute, on a streaming basis, a minimum price for the stock prices within the matched data.

13. The apparatus of claim 12 wherein the summarization hardware logic comprises:
a first register configured to store the stock price data within the matched data, wherein the summarization hardware logic is further configured to stream the stock price data within the matched data through the first register;
a second register configured to store data representative of the minimum price for the stock corresponding to the stock prices streaming through the first register; and
a comparator configured to compare the stock prices streaming through the first register with the minimum price in the second register;
wherein the summarization hardware logic is further configured to update the minimum price in the second register based on the comparison by the comparator as the stock price data streams through the first register to thereby provide a running computation of the minimum price for the stock corresponding to the streaming stock price data in the first register.

14. The apparatus of claim 13 wherein the first register comprises a data shift register through which the stock price data is streamed.

15. The apparatus of claim 1 wherein the summarization hardware logic is configured to compute, on a streaming basis, a latest price for the stock prices within the matched data.

16. The apparatus of claim 15 wherein the stock price data within the matched data includes times associated with the stock prices for the stock, and wherein summarization hardware logic comprises:
a first register configured to store the stock price data within the matched data, wherein the summarization hardware logic is further configured to stream the stock price data within the matched data through the first register;
a second register configured to store data representative of a time for the latest price for the stock corresponding to the stock prices streaming through the first register;
a third register configured to store data representative of the latest price for the stock corresponding to the stock prices streaming through the first register; and
a comparator configured to compare the stock price times streaming through the first register with the time in the second register; and
wherein the summarization hardware logic is further configured to update the latest price in the third register based on the comparison by the comparator as the stock price data streams through the first register to thereby provide a running computation of the latest price for the stock corresponding to the streaming stock price data in the first register.

17. The apparatus of claim 16 wherein the first register comprises a data shift register through which the stock price data is streamed.

18. The apparatus of claim 1 wherein the matching hardware logic and the summarization hardware logic are configured to operate at hardware processing speeds.

19. The apparatus of claim 1 wherein the processor is arranged to serve as a control processor, wherein the control processor is configured to execute software to set up the FPGA for loading a new hardware template thereon to thereby reconfigure the FPGA to perform a different operation.

20. The apparatus of claim 1 wherein the FPGA further includes a control processor, the control processor configured to set up the FPGA for loading a new hardware template thereon to thereby reconfigure the FPGA to perform a different operation.

21. The apparatus of claim 1 further comprising a data storage device for storing the financial information, and wherein the FPGA is further configured to read from the data storage device to receive the streaming financial information.

22. The apparatus of claim 21 wherein the data storage device comprises a mass storage medium.

23. The apparatus of claim 1 wherein the matching hardware logic is further configured to perform the match operation on a frame-by-frame basis.

24. The apparatus of claim 1 wherein the matching hardware logic is further configured to perform the match operation on a frameless basis.

25. The apparatus of claim 1 further comprising:
a memory;
wherein the processor is configured to transform an inquiry into the hardware template and communicate the hardware template to the memory for loading onto the FPGA.

26. The apparatus of claim 25 wherein the processor is further configured to execute software to transform the inquiry into the hardware template.

27. The apparatus of claim 1 wherein the match operation comprises an exact match operation.

28. The apparatus of claim 1 wherein the match operation comprises an approximate match operation.

29. The apparatus of claim 2 wherein the summarization hardware logic further comprises a first register configured to store the stock price data within the matched data, wherein the summarization hardware logic is further configured to stream the stock price data within the matched data through the first register, and wherein the parallel paths comprise:

a first parallel path comprising a second register and a first comparator;
a second parallel path comprising a third register and a second comparator;
the second register configured to store data representative of a minimum price for the stock corresponding to the stock prices streaming through the first register;
the third register configured to store data representative of a maximum price for the stock corresponding to the stock prices streaming through the first register;
wherein the first comparator is configured to compare the stock prices streaming through the first register with the minimum price in the second register;
wherein the second comparator is configured to compare the stock prices streaming through the first register with the maximum price in the third register; and
wherein the summarization hardware logic is further configured to update the minimum price in the second register and the maximum price in the third register based on the comparisons by the first and second comparators respectively as the stock price data streams through the first register to thereby provide running computations of the minimum price and the maximum price for the stock corresponding to the streaming stock price data in the first register.

30. The apparatus of claim 29 wherein the first register comprises a data shift register through which the stock price data is streamed.

31. The apparatus of claim 29 wherein the stock price data within the matched data includes times associated with the stock prices for the stock, and wherein the parallel paths further comprise:
a third parallel path comprising a fourth register, a fifth register, and a third comparator;
the fourth register configured to store data representative of a time for a latest price for the stock corresponding to the stock prices streaming through the first register;
the fifth register configured to store data representative of the latest price for the stock corresponding to the stock prices streaming through the first register;
wherein the third comparator is configured to compare the stock price times streaming through the first register with the time in the fourth register; and
wherein the summarization hardware logic is further configured to update the latest price in the fifth register based on the comparison by the third comparator as the stock price data streams through the first register to thereby provide running computations of the minimum price, the maximum price, and the latest price for the stock corresponding to the streaming stock price data in the first register.

32. The apparatus of claim 31 wherein the first register comprises a data shift register through which the stock price data is streamed.

33. The apparatus of claim 11 wherein the first register comprises a data shift register through which the stock price data is streamed.

34. The apparatus of claim 1 wherein the processor comprises a CPU.

35. A method for financial information data reduction searching, the method comprising:
performing, by a field programmable gate array (FPGA), a data reduction operation on streaming financial information, the streaming financial information comprising data representative of a plurality of stocks and data representative of a plurality of prices for the stocks, the FPGA having a hardware template deployed thereon that configures the FPGA to perform the data reduction operation, wherein the FPGA, as configured by the hardware template, comprises matching hardware logic and downstream summarization hardware logic, wherein the matching hardware logic and the summarization hardware logic are configured in a pipelined orientation on the FPGA such that the matching hardware logic and the summarization hardware logic are configured to operate simultaneously with each other, wherein the matching hardware logic and summarization hardware logic exist as a configured array of interconnected logic gate units within the FPGA, the interconnected logic gate units comprising an arrangement of a plurality of registers and comparators deployed on the FPGA in the pipelined orientation;
controlling the FPGA via a processor in cooperation with the FPGA; and
the processor performing other tasks while the FPGA is processing on the streaming financial information; and
wherein the data reduction performing step comprises (1) the matching hardware logic performing a match operation on the streaming financial information to find matched data within the streaming financial information, wherein the matched data comprises data representative of a plurality of stock prices for a stock, (2) the summarization hardware logic generating a price summary of the stock prices within the matched data, and (3) the summarization hardware logic performing the price summary generating step on matched data previously found by the matching hardware logic while the matching hardware logic is operating on new streaming financial information, the matching hardware logic and the summarization hardware logic thereby simultaneously operating together to generate a running computation of the price summary on a streaming basis as the financial information streams through the FPGA.

36. The method of claim 35 wherein the summarization hardware logic comprises a plurality of parallel paths, and wherein the price summary generating step comprises the parallel paths simultaneously computing, on a streaming basis, a plurality of different price summaries of the stock prices within the matched data.

37. The method of claim 36 wherein the FPGA further includes a data shift register, and wherein the data reduction performing step further comprises streaming the financial information through the data shift register for processing by the marching hardware logic and the summarization hardware logic.

38. The method of claim 36 wherein the summarization hardware logic further comprises a first register, and wherein the parallel paths comprise:
a first parallel path comprising a second register and a first comparator;
a second parallel path comprising a third register and a second comparator; and
wherein the simultaneously computing step comprises:
the summarization hardware logic streaming the stock price data within the matched data through the first register;
the second register storing data representative of a minimum price for the stock corresponding to the stock prices streaming through the first register;
the third register storing data representative of a maximum price for the stock corresponding to the stock prices streaming through the first register;

the first comparator comparing the stock prices streaming through the first register with the minimum price in the second register;

the second comparator comparing the stock prices streaming through the first register with the maximum price in the third register; and the summarization hardware logic updating the minimum price in the second register and the maximum price in the third register based on the comparisons by the first and second comparators respectively as the stock price data streams through the first register to thereby provide running computations of the minimum price and the maximum price for the stock corresponding to the streaming stock price data in the first register.

39. The method of claim 38 wherein the first register comprises a data shift register through which the stock price data is streamed.

40. The method of claim 38 wherein the stock price data within the matched data includes times associated with the stock prices for the stock, and wherein the parallel paths further comprise:

a third parallel path comprising a fourth register, a fifth register, and a third comparator; and wherein the simultaneously computing step further comprises:

the fourth register storing data representative of a time for a latest price for the stock corresponding to the stock prices streaming through the first register;

the fifth register storing data representative of the latest price for the stock corresponding to the stock prices streaming through the first register;

the third comparator is configured to compare the stock price times streaming through the first register with the time in the fourth register; and the summarization hardware logic updating the latest price in the fifth register based on the comparison by the third comparator as the stock price data streams through the first register to thereby provide running computations of the minimum price, the maximum price, and the latest price for the stock corresponding to the streaming stock price data in the first register.

41. The method of claim 40 wherein the first register comprises a data shift register through which the stock price data is streamed.

42. The method of claim 36 wherein the parallel paths comprise a first parallel path, a second parallel path, and a third parallel path, and wherein the parallel paths simultaneously computing step comprises:

the first parallel path computing a maximum price for the stock prices within the matched data;

the second parallel path computing a minimum price for the stock prices within the matched data; and the third parallel path computing a latest price for the stock prices within the matched data.

43. The method of claim 42 wherein the match operation performing step comprises the matching hardware logic (1) storing a data key, (2) receiving the streaming financial information, and (3) matching the received streaming financial information against the data key to find the matched data.

44. The method of claim 43 further comprising:

the hardware template supporting a plurality of different matches for the matching hardware logic without requiring that a new hardware template be loaded onto the FPGA, and the processor determining a new data key and communicating the new data key to the FPGA for storage therein to thereby modify the matching hardware logic to search for the new data key within the streaming financial information.

45. The method of claim 43 further comprising the matching hardware logic and the summarization hardware logic operating at hardware processing speeds.

46. The method of claim 42 further comprising the matching hardware logic and the summarization hardware logic operating at hardware processing speeds.

47. The method of claim 36 further comprising the matching hardware logic and the summarization hardware logic operating at hardware processing speeds.

48. The method of claim 35 wherein the price summary generating step comprises the summarization hardware logic computing, on a streaming basis, a maximum price for the stock prices within the matched data.

49. The method of claim 48 wherein the summarization hardware logic comprises:

a first register;
a second register; and
a comparator; and
wherein the computing step comprises:

the first register storing the stock price data within the matched data, wherein the summarization hardware logic is further configured to stream the stock price data within the matched data through the first register;

a second register storing data representative of the maximum price for the stock corresponding to the stock prices streaming through the first register;

the comparator comparing the stock prices streaming through the first register with the maximum price in the second register; and the summarization hardware logic updating the maximum price in the second register based on the comparison by the comparator as the stock price data streams through the first register to thereby provide a running computation of the maximum price for the stock corresponding to the streaming stock price data in the first register.

50. The method of claim 49 wherein the first register comprises a data shift register through which the stock price data is streamed.

51. The method of claim 35 wherein the price summary generating step comprises the summarization hardware logic computing, on a streaming basis, a minimum price for the stock prices within the matched data.

52. The method of claim 51 wherein the summarization hardware logic comprises:

a first register;
a second register; and
a comparator; and
wherein the computing step comprises:

the first register storing the stock price data within the matched data, wherein the summarization hardware logic is further configured to stream the stock price data within the matched data through the first register;

the second register storing data representative of the minimum price for the stock corresponding to the stock prices streaming through the first register;

the comparator comparing the stock prices streaming through the first register with the minimum price in the second register; and the summarization hardware logic updating the minimum price in the second register based on the comparison by the comparator as the stock price data streams through the first register to thereby provide a running computation of the minimum price for the stock corresponding to the streaming stock price data in the first register.

53. The method of claim 52 wherein the first register comprises a data shift register through which the stock price data is streamed.

54. The method of claim 35 wherein the price summary generating step comprises the summarization hardware logic computing, on a streaming basis, a latest price for the stock prices within the matched data.

55. The method of claim 54 wherein the stock price data within the matched data includes times associated with the stock prices for the stock, and wherein summarization hardware logic comprises:
a first register;
a second register;
a third register; and
a comparator; and
wherein the computing step comprises:
the first register storing the stock price data within the matched data, wherein the summarization hardware logic is further configured to stream the stock price data within the matched data through the first register;
the second register storing data representative of a time for the latest price for the stock corresponding to the stock prices streaming through the first register;
the third register storing data representative of the latest price for the stock corresponding to the stock prices streaming through the first register;
the comparator comparing the stock price times streaming through the first register with the time in the second register; and
the summarization hardware logic updating the latest price in the third register based on the comparison by the comparator as the stock price data streams through the first register to thereby provide a running computation of the latest price for the stock corresponding to the streaming stock price data in the first register.

56. The method of claim 55 wherein the first register comprises a data shift register through which the stock price data is streamed.

57. The method of claim 35 further comprising the matching hardware logic and the summarization hardware logic operating at hardware processing speeds.

58. The method of claim 35 wherein the processor is arranged to serve as a control processor, the method further comprising:
the control processor executing software, the software setting up the FPGA for loading a new hardware template thereon to thereby reconfigure the FPGA to perform a different operation.

59. The method of claim 35 wherein the FPGA further includes a control processor, the method further comprising:
the control processor configured as part of the FPGA setting up the FPGA for loading a new hardware template thereon to thereby reconfigure the FPGA to perform a different operation.

60. The method of claim 35 further comprising:
a data storage device storing the financial information; and
the FPGA reading from the data storage device to receive the streaming financial information.

61. The method of claim 60 wherein the data storage device comprises a mass storage medium.

62. The method of claim 35 wherein match operation performing step comprises the matching hardware logic performing the match operation on a frame-by-frame basis.

63. The method of claim 35 wherein match operation performing step comprises the matching hardware logic performing the match operation on a frameless basis.

64. The method of claim 35 further comprising:
the processor transforming an inquiry into the hardware template and communicating the hardware template to a memory for loading onto the FPGA.

65. The method of claim 64 wherein the transforming and communicating steps comprise the processor executing software.

66. The method of claim 35 wherein the match operation comprises an exact match operation.

67. The method of claim 35 wherein the match operation comprises an approximate match operation.

68. The method of claim 35 wherein the processor comprises a CPU.

* * * * *